US012685996B2

(12) United States Patent
Peng et al.

(10) Patent No.: US 12,685,996 B2
(45) Date of Patent: Jul. 21, 2026

(54) HYBRID ULTRAMICROPOROUS MATERIALS FOR WATER CAPTURE AND RELEASE

(71) Applicant: UNIVERSITY OF LIMERICK, Limerick (IE)

(72) Inventors: Yun-Lei Peng, Limerick (IE); Shiqiang Wang, Limerick (IE); Michael Zaworotko, Limerick (IE); Shaza Darwish, Limerick (IE); Andrey Bezrukov, Limerick (IE)

(73) Assignee: THE UNIVERSITY OF LIMERICK, Limerick (IE)

( * ) Notice: Subject to any disclaimer, the term of this patent is extended or adjusted under 35 U.S.C. 154(b) by 720 days.

(21) Appl. No.: 17/913,038

(22) PCT Filed: Mar. 19, 2021

(86) PCT No.: PCT/EP2021/057159
§ 371 (c)(1),
(2) Date: Sep. 20, 2022

(87) PCT Pub. No.: WO2021/186073
PCT Pub. Date: Sep. 23, 2021

(65) Prior Publication Data

US 2023/0285932 A1 Sep. 14, 2023

(30) Foreign Application Priority Data

Mar. 20, 2020 (EP) .................................... 20164732

(51) Int. Cl.
*B01J 20/22* (2006.01)
*B01D 53/02* (2006.01)
(Continued)

(52) U.S. Cl.
CPC ............ *B01J 20/226* (2013.01); *B01D 53/02* (2013.01); *B01D 53/261* (2013.01);
(Continued)

(58) Field of Classification Search
CPC .. B01D 53/02; B01D 53/261; B01D 2253/25; B01D 2270/80; B01D 2259/40088;
(Continued)

(56) References Cited

U.S. PATENT DOCUMENTS

2009/0183996 A1* 7/2009 Richter ................ C07D 235/22 205/423
2013/0283846 A1* 10/2013 Baumann .............. F25B 17/083 62/476

(Continued)

FOREIGN PATENT DOCUMENTS

WO 2019152962 A2 8/2019
WO 2020021112 A1 1/2020

OTHER PUBLICATIONS

Metal organic frameworks as regeneration optimized sorbents for atmospheric water harvesting (Year: 2023).*

(Continued)

*Primary Examiner* — Jennifer Dieterle
*Assistant Examiner* — Phillip Y Shao
(74) *Attorney, Agent, or Firm* — Hoffman Warnick LLC

(57) ABSTRACT

A method of capturing water from a composition comprising water or water vapour using a hybrid ultramicroporous material. The method comprises the steps of: (a) providing a hybrid ultramicroporous material of formula [M(L)a(X)b]; and (b) contacting the hybrid ultramicroporous material with the composition comprising water to capture water into the hybrid ultramicroporous material; The hybrid ultramicroporous materials used in the method of the present invention have fast kinetics of water uptake and high working capacity
(Continued)

compared to known commercial sorbent materials. The method of the present invention may be used in water capture and purification processes to provide fresh water suitable for drinking or for use in agriculture. The method of the present invention may also be used to remove water as a contaminant or for use in dehumidification processes. A use of such a hybrid ultramicroporous material and a device for capturing water are also disclosed.

13 Claims, 12 Drawing Sheets

(51) Int. Cl.

| | |
|---|---|
| ***B01D 53/26*** | (2006.01) |
| ***B01J 20/30*** | (2006.01) |
| ***B01J 20/34*** | (2006.01) |
| ***C02F 1/28*** | (2023.01) |
| *C02F 103/08* | (2006.01) |

(52) U.S. Cl.

CPC ....... *B01J 20/3085* (2013.01); *B01J 20/3425* (2013.01); *B01J 20/3483* (2013.01); *B01J 20/3491* (2013.01); *C02F 1/288* (2013.01); *B01D 2253/25* (2013.01); *B01D 2257/80* (2013.01); *B01D 2259/4009* (2013.01); *C02F 1/281* (2013.01); *C02F 1/285* (2013.01); *C02F 2103/08* (2013.01); *C02F 2303/16* (2013.01)

(58) Field of Classification Search

CPC .......... B01D 2259/4009; B01J 20/0244; B01J 20/027; B01J 20/226; B01J 20/2808; B01J 20/3078; B01J 20/3085; B01J 20/3425; B01J 20/3483; B01J 20/3491; C02F 1/281; C02F 1/285; C02F 1/288; C02F 2103/08; C02F 2303/16; Y02W 10/37

See application file for complete search history.

(56) References Cited

U.S. PATENT DOCUMENTS

| | | | | |
|---|---|---|---|---|
| 2016/0084541 | A1* | 3/2016 | Aguado | F25B 17/083 62/238.3 |
| 2018/0171604 | A1* | 6/2018 | Kim | B01J 20/3204 |
| 2019/0234053 | A1* | 8/2019 | Kim | B01J 20/103 |

OTHER PUBLICATIONS

PCT International Search Report and Written Opinion for International Application No. PCT/EP2021/057159, dated Jun. 14, 2021, 16 pages.

Great Britain Search Report for Application No. 20164732.8, dated Sep. 14, 2020, 10 pages.

Zhaolin et al., "Robust Metal-Triazolate Frameworks for CO2 Capture from Flue Gas," Journal of the American Chemical Society, vol. 142, No. 6, 2750-2754, Jan. 23, 2020.

Zhaolin et al., Supporting Information "Robust Metal Triazolate Frameworks for CO2 Capture from Flue Gas," Feb. 12, 2020.

Chen et al., "Stable fluorinated 3D isoreticular nanotubular triazole MOFs: synthesis, characterization and CO2 separation," Journal of Porous Materials, Springer, vol. 26, No. 6, May 9, 2019.

Chen et al., Supplementary Materials "Stable Fluorinated 3D Isoreticular Nanotubular Triazole MOFs: Synthesis, Characterization and CO2 Separation," May 9, 2019.

Zhu, A. X., Lin, J.B., Zhang, J.P, & Chen, x.M., (2009), "Isomeric zinc (II) triazolate frameworks with 3-connected networks; syntheses, structures, and sorption properties," Inorganic chemistry, 48(8), 3882-3889.

Furukawa H., Cordova, K.E., O'Keeffe, M, & Yaghi, O.M., (2013), The Chemistry and applications of metal-organic frameworks, Science 341(6149) 1230444.

Kim, H., Yang S., Rao, S.R., Narayanan, S. Kapustin, E.A., Furukawa, H., . . . & Wang, E.N., (2017), "Water harvesting from air with metal-organic frameworks powered by natural sunlight," Science 356 (6336), 430-434.

Kim H., Rao, S.R., Kapustin, E.A., Zhao, L., Yang, S., Yaghi, O.m., & Wang, E.N. (2018), "Adsorption-based atmospheric water harvesting device for arid climates," Nature Communications, 9(1) 1-8.

Fathieh F., Kalmutzki, M.J. Kapustin, E.A., Waller, P.J., Yang, J., & Yaghi, O.M., (2018), "Practical water production from desert air," Science advances 4(6) east, 3198.

Hanikel, N., Prevot, M.s., Fathieh, F, Kapustin, E.A., Lyu, H., Wang, H., . . . & Yaghi, O.M, (2019), "Rapid Cycling and Exceptional Yield in a Metal-Organic Framework Water Harvester," ACS central science, 5(10), 1699-1706.

Nguyen, H.L., Hanikel, N., Lyle, S.J., Zhu, C., Proserpio, D.M., & Yaghi, O.M., (2020), A Porous Covalent Organic Framework with Voided Square Grid Topology for Atmospheric Water Hanvesting, J. Am. Chem. Soc., 2020, 142, 2218-2221.

Su, C Y, Gosforth, A.M, Smith, M.D., Pellechia, P.J., & zur loye, H.C., (2004), "Exceptionally stable, hollow tubular metal organic architectures: synthesis, characterization and solid-state transformation study," Journal of American Chemical Society 126(11).3576-3586.

Gosforth A.M., Su, C.Y.,Hipp, R., Macquart, R.B., Smith, M.D., & zur Loye, H.C., (2005), "Connecting small ligands to generate large tubular metal-organic architectures," Journal of Solid State Chemistry, 178(8), 2511-2518.

* cited by examiner

HYBRID ULTRAMICROPOROUS MATERIALS FOR WATER CAPTURE AND RELEASE

FIELD

The present invention relates to a method of capturing water from a composition comprising water or water vapour. The present invention also relates to a use of a hybrid ultra-microporous material of formula $[M(L)_a(X)_b]$ for capturing water and to a water capture device comprising said hybrid ultra-microporous material. In particular, the present invention relates to capturing water using said hybrid ultra-microporous material having fast kinetics of water adsorption, water desorption and high water productivity.

BACKGROUND

Water is one of the Earth's most fundamental resources, with plants, animals and humans all needing freshwater for survival. Water is also used heavily in agriculture and industrial processes. Water demand globally is projected to increase by 55% between 2000 and 2050. Much of this demand is driven by growing populations.

Thus there is a need to provide water in purified form, for example from gas and liquid sources comprising water and other components or impurities. A significant majority of the water on Earth is salt water, such as seawater or brackish water (which is a combination of seawater and freshwater). Fresh/pure water may be produced from seawater or to a lesser degree, brackish water. In these processes, the concentration of dissolved salts and other contaminants is reduced to provide the fresh/purified water. However, many of these existing purification and desalination processes require massive amounts of energy.

Atmospheric water vapour is an underexploited natural water resource which has the potential to provide purified water from air. In addition, the control of humidity in heating, ventilation and air conditioning (HVAC) systems involves removing water from air to create a less humid environment. Current HVAC systems use substantial amounts of energy and therefore even a small reduction in energy consumption can be highly beneficial.

Research into water capture materials has focused on sorbent materials such as zeolites and silica. These sorbents materials contain many cavities or binding sites for the adsorption of small molecules such as water and they are also used in related applications, for example carbon dioxide capture and gas separation. However, water capture and delivery using these sorbent materials is too energy intensive to be economically viable, as desorption requires significant heating.

More recently, attention has turned metal-organic frameworks (MOFs) and covalent-organic frameworks (COFs). However, like zeolites and silica, many of these sorbent materials have a low working capacity caused by poor water uptake, unsuitable adsorption profiles and require high energy for recycling.

Therefore, there is a need for new classes of sorbent materials that are able to capture water vapour over a range of humidities and offer low energy footprints for recycling.

SUMMARY OF THE INVENTION

It is one aim of the present invention, amongst others, to provide a sorbent material and/or a method of capturing water using a sorbent material that addresses at least one disadvantage of the prior art, whether identified here or elsewhere, or to provide an alternative to existing sorbent materials. For instance, it may be an aim of the present invention to provide a method of capturing water using a sorbent material which has high water uptake and rapid sorption and desorption kinetics.

According to aspects of the present invention, there is provided a method, use and device as set forth in the appended claims. Other features of the invention will be apparent from the dependent claims, and from the description which follows.

According to a first aspect of the present invention, there is provided a method of capturing water from a composition comprising water or water vapour, the method comprising:

(a) providing a hybrid ultramicroporous material of formula $[M(L)_a(X)_b]$; and (b) contacting the hybrid ultramicroporous material with the composition comprising water to capture water into the hybrid ultramicroporous material;

wherein:

M is a metal species selected from zinc, cadmium, copper, magnesium, cobalt, nickel, calcium and iron;

L is a ligand comprising a N-containing heterocycle;

X is a halogen linking species;

a is from 0.5 to 3; and b is from 1 to 3.

Water can enter into the pores of the hybrid ultramicroporous material materials and may be held within the pores by intermolecular interactions, for example by hydrogen bonding. This may be considered a process of absorbing water into the bulk of the hybrid ultramicroporous material. In another sense, this may be considered to be a process of adsorbing the water molecules onto a surface of the hybrid ultramicroporous material, whether that be the outer surface of the material or the inner surface of the pores comprised within the crystal structure of the hybrid ultramicroporous material. These materials are considered to mainly function by taking water into the pores in their crystal structure. The terms "capture" and alternatively "sorbing" are used herein to describe this process which may be considered to be either adsorbing or absorbing.

Herein the terms "adsorb", "absorb", "adsorbed", "absorbed", "adsorbing" and "absorbing" are used to denote this process of water being taken up (i.e. captured) by the hybrid ultramicroporous material, whether or not this process is considered a true "adsorbing" or "absorbing" process.

The term "release" is used herein to denote a desorption process.

Figure 1A:
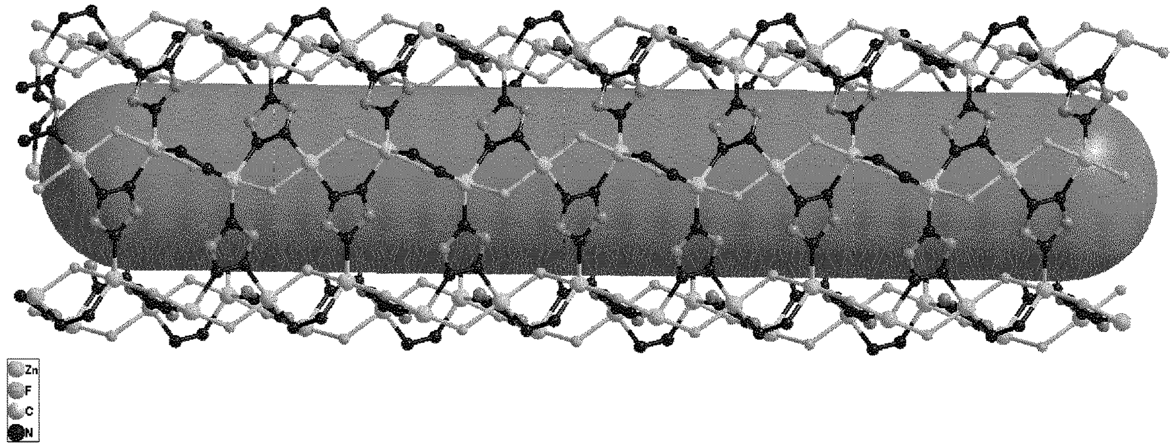
FIG. 1A: Crystallographic structure of [Zn (1,2,4-triazole) F] showing the one dimensional channel formed.

The inventors have surprisingly found that this class of hybrid ultramicroporous materials may have desirable water capture properties for use in industrial water capture processes and devices. For example, the hybrid ultramicroporous materials may have a relatively high capacity for water uptake and rapid kinetics of adsorption and desorption of water, which are particularly advantageous for industrial water capture where water delivery over time is an important factor in the economic feasibility of such processes. These materials can be used in a variety of processes, such as in HVAC systems and in desalination. The water captured by the method may be removed from the hybrid ultramicroporous material to advantageously provide a supply of purified water for the various uses described herein.

The inventors have surprisingly found that this class of hybrid ultramicroporous materials may have desirable water capture properties for use in industrial water capture processes and devices. For example, the hybrid ultramicroporous materials may have a relatively high capacity for water uptake and rapid kinetics of adsorption and desorption of water, which are particularly advantageous for industrial water capture where water delivery over time is an important factor in the economic feasibility of such processes. These materials can be used in a variety of processes, such as in HVAC systems and in desalination. The water captured by the method may be removed from the hybrid ultramicroporous material to advantageously provide a supply of purified water for the various uses described herein.

Preferred features of the first aspect of the invention will now be described.

The method of the first aspect utilises certain hybrid ultramicroporous materials (HUMs). The formula of the hybrid ultramicroporous material is $[M(L)_a(X)_b]$, i.e. the hybrid ultramicroporous material comprises a repeat unit having the formula $[M(L)_a(X)_b]$. The hybrid ultramicroporous material having this repeat unit comprises a three-dimensional lattice of metal species (M) and linker groups wherein the metal species (M) are linked together by combinations of organic linker groups (L) and inorganic linker groups (X) to form a three-dimensional network structure.

The hybrid ultramicroporous materials of the present invention are of the formula $[M(L)_a(X)_b]$ wherein M is a metal species selected from zinc, cadmium, copper, magnesium, cobalt, nickel, calcium and iron; L is a ligand comprising a N-containing heterocycle; X is a halogen linking species; a is from 0.5 to 3 and b is from 1 to 3.

Suitably the metal species M is charged and is suitably provided as a cation. Suitably the metal species M is selected from $Zn^{2+}$, $Cd^{2+}$, $Cu^{2+}$, $Mg^{2+}$, $Co^{2+}$, $Ni^{2+}$, $Ca^{2+}$ or $Fe^{2+}$.

In some preferred embodiments M is zinc. Preferably M is $Zn^{2+}$.

In some embodiments the hybrid ultramicroporous material comprises a mixture of metal species M. In some embodiments all the metal species M in the hybrid ultramicroporous material are the same.

The organic linker group (L) is a ligand comprising a N-containing heterocycle. This may be alternatively referred to as an azole ligand. Suitably L comprises at least two nitrogen donor atoms, which are suitably able to bind to the metal species M in the hybrid ultramicroporous material. Suitably L comprises three such nitrogen donor atoms. Suitably all three nitrogen donor atoms are present in an aromatic heterocycle in L. Suitably L comprises an optionally substituted triazole or an optionally substituted triazine. Suitably L comprises a triazole.

Suitably L is of formula (I):

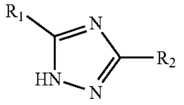

(I)

$R^1$ and $R^2$ may each independently be selected from hydrogen, halo (especially fluoro, chloro and bromo), hydroxy, alkoxy, keto, acyl, cyano, mercapto, alkylmercapto, amino, alkylamino, nitro, nitroso, sulphoxy, and alkyl or alkenyl groups comprising from 1 to 20 carbon atoms, suitably from 1 to 10 carbon atoms, suitably from 1 to 5 carbon atoms.

In some embodiments $R^1$ and $R^2$ are the same. In other embodiments $R^1$ and $R^2$ are different.

In some embodiments $R^2$ is hydrogen and $R^1$ is selected from halo (especially fluoro, chloro and bromo), hydroxy, alkoxy, keto, acyl, cyano, mercapto, alkylmercapto, amino, alkylamino, nitro, nitroso, sulphoxy, and alkyl or alkenyl groups comprising from 1 to 20 carbon atoms, suitably from 1 to 10 carbon atoms, suitably from 1 to 5 carbon atoms.

Suitably L is selected from any one or more of:

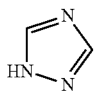

L1

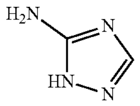

L2

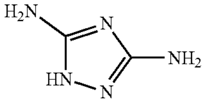

L3

-continued

L4

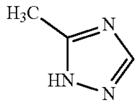

L5

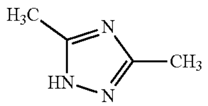

L6

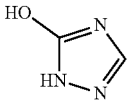

L7

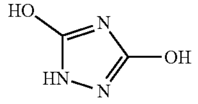

L8

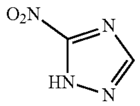

L9

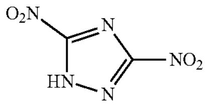

L10

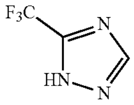

L11

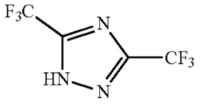

L12

L13

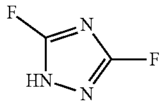

L14

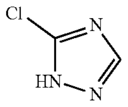

L16

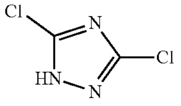

L17

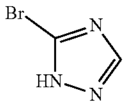

L18

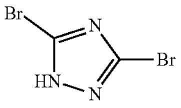

-continued

L19

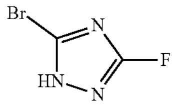

L20

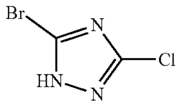

L21

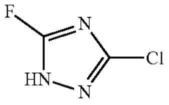

Suitably L is one of L1-L21.

In preferred embodiments L is selected from 1,2,4-triazole (L1) or 3-amino-1,2,4-triazole (L2). In some embodiments L is 1,2,4-triazole (L1). In some embodiments L is 3-amino-1,2,4-triazole (L2).

In the hybrid ultramicroporous material of formula $[M(L)_a(X)_b]$, L suitably provides at least two bonding interactions to M species, suitably three bonding interactions to M species.

X is a halogen linking species. Suitably X is a halide anion selected from fluoride, chloride, bromide and iodide.

In preferred embodiments X is selected from fluoride or chloride. Most preferably X is fluoride.

In the hybrid ultramicroporous material of formula $[M(L)_a(X)_b]$, X suitably provides at least two bonding interactions to M species, suitably two bonding interactions to M species.

In one preferred embodiment, M is $Zn^{2+}$, L is 3-amino-1,2,4-triazole and X is fluoride.

In one especially preferred embodiment, M is $Zn^{2+}$, L is 1,2,4-triazole (L1) or 3-amino-1,2,4-triazole (L2) and X is fluoride.

The hybrid ultramicroporous material used in the present invention is suitably neutral in the sense that there are no counterions in its pores. Suitably the ratio of L and X may be altered to provide a charge neutral material. In the hybrid ultramicroporous material a is from 0.5 to 3 and b is from 1 to 3, suitably a is from 1 to 2 and b is from 1 to 2. In preferred embodiments each of a and b is 1.

The hybrid ultramicroporous materials used in the present invention may be prepared by any suitable method, for example by solid state synthesis, crystallisation from a suitable solvent, slurrying, direct mixing or mechanochemistry, each with or without heating. For example, the hybrid ultramicroporous material may be prepared by any of the above methods by reacting an approximately equimolar amount of the metal species M, for example a salt of the metal species M, the ligand L and the halogen linking species X, for example a salt, optionally together in a suitable solvent, for example a mixture of water and methanol, optionally with heating.

The materials used in the present invention are described as ultramicroporous as they comprise pores with an effective pore size of less than 0.7 nm (7 Å). Suitably the hybrid ultramicroporous materials comprise pores with an effective pore size of from 2 Å to 7 Å.

Effective pore size may be additionally or alternatively defined as the effective pore diameter. Effective pore size/diameter is a measure of the dimensions of the pore at the narrowest point of the pore. These values take into account the van der Waals radii of the atoms lining the pore wall (i.e. they are not atom to atom distances).

In one preferred embodiment the hybrid ultramicroporous material has the formula [Zn(1,2,4-triazole)F]. This material may be referred to herein as ROS-039.

In one preferred embodiment the hybrid ultramicroporous material has the formula [Zn(3-amino-1,2,4-triazole)F]. This material may be referred to herein as ROS-040.

Without being bound by theory, it is believed that the hybrid ultramicroporous materials used in the present invention preferentially capture water molecules due to the sorbent materials having a pore size (effective pore size) and pore chemistry which is complementary to water and which favours water absorption or adsorption. Such materials may provide excellent water selectivity and capacity, which will be further demonstrated below.

Suitably in the method of the first aspect, step (a), provision of the sorbent material, and (b), contacting the sorbent material with the composition comprising water to capture water, are carried out sequentially, suitably in the order step (a) followed by step (b).

In some embodiments the method of this first aspect may involve the use of two or more sorbent materials, one of which is a hybrid ultramicroporous material as described above. In such embodiments, the method may involve the use of two or more of the hybrid ultramicroporous materials described above. In such embodiments any reference to the hybrid ultramicroporous materials includes mixtures.

In the methods of this first aspect, the composition comprising water or water vapour may be any composition comprising water and/or water vapour. The composition may be a gaseous composition comprising water vapour, suitably air. The composition may be a liquid composition comprising water, suitably a complex liquid composition comprising water and one or more further components, for example salted water including sea and ocean water, brackish water or waste water.

In some embodiments water is not the major component of the composition and may, for example, be present as an impurity. In such embodiments the method of the first aspect may be used to remove water, for example to create an anhydrous composition or to provide dehumidified air.

In some embodiments water is the major component of the composition, for example a liquid aqueous composition comprising impurities such as dissolved salts. In such embodiments the method of this first aspect may be used to provide purified water.

In some embodiments the composition comprising water or water vapour may be treated before use in the present invention. In preferred embodiments the composition comprising water or water vapour is not treated before use.

Step (b) of the method of the first aspect involves contacting the hybrid ultramicroporous material with the composition comprising water or water vapour to capture water into the hybrid ultramicroporous material. Suitably the hybrid ultramicroporous material is directly contacted with the composition comprising water or water vapour.

In embodiments wherein the composition is a liquid composition comprising water, the liquid composition comprising water may be any body of water. The liquid composition comprising water may be still or standing water or may be moving, for example flowing water.

Suitably contact between the hybrid ultramicroporous material and the composition comprising water or water vapour is sufficient to allow adsorption or absorption of water from the composition comprising water and/or water vapour into the pores of the hybrid ultramicroporous material.

The hybrid ultramicroporous material is suitably provided in a form that facilitates contact with the composition comprising water or water vapour.

The hybrid ultramicroporous material may be provided as a powder. Suitably when contacted with the composition comprising water or water vapour the sorbent powder may be wetted. In embodiments wherein the composition is a liquid composition comprising water, the sorbent powder may be dispersed into the liquid composition comprising water.

The hybrid ultramicroporous material may be provided in the form of shaped bodies, for example in the form of pellets, granules or tablets. In embodiments wherein the composition comprising water is a liquid composition comprising water, such sorbent pellets, granules or tablets may be placed in the liquid composition comprising water or exposed to the liquid composition comprising water.

The hybrid ultramicroporous material may be provided as a sheet material.

The hybrid ultramicroporous material may be provided as part of a membrane. In such embodiments the composition comprising water and/or water vapour may flow across or through the sorbent membrane.

Preferably the hybrid ultramicroporous material is provided within or carried on a support. Suitably the support may help to maintain the form of the hybrid ultramicroporous material under normal conditions of use.

The hybrid ultramicroporous material is suitably arranged on the support in a configuration to ensure maximum sorption. The hybrid ultramicroporous material may be arranged on the surface of the support or incorporated within the body of the support.

The support may be selected from any suitable polymeric, plastic, metal, resin and/or composite material. A person skilled in the art will be familiar with these types of material and will be able to select the most appropriate support for the device.

In some embodiments the support is a polymer material. In one embodiment the support comprises an acrylic polymer. Suitable acrylic polymers include commercially available HYCAR® 26410 from the Lubrizol Corporation.

In one embodiment the support comprises a cellulosic material, for example paper. The support may comprise a composite material of paper and another polymer.

The hybrid ultramicroporous material and the support may be considered to provide a sorbent composition. The sorbent composition suitably comprises from 10 to 90 wt % of the hybrid ultramicroporous material, suitably from 30 to 70 wt % of the hybrid ultramicroporous material, suitably from 40 to 60 wt % of the hybrid ultramicroporous material, suitably approximately 50 wt % of the hybrid ultramicroporous material.

The sorbent composition suitably comprises from 10 to 90 wt % of the hybrid ultramicroporous material and from 90 to 10 wt % of the support, suitably from 30 to 70 wt % of the hybrid ultramicroporous material and from 70 to 30 wt % of the support, suitably from 40 to 60 wt % of the hybrid ultramicroporous material and from 60 to 40 wt % of the support.

Suitably the sorbent composition consists essentially of the hybrid ultramicroporous material and the support. Suitably the sorbent composition consists of the hybrid ultramicroporous material and the support.

In some embodiments the hybrid ultramicroporous material is contacted with flowing or running water. The hybrid ultramicroporous material may be positioned so that the liquid composition comprising water falls onto the sorbent material. For example the hybrid ultramicroporous material may be placed underneath a stream of flowing water.

The hybrid ultramicroporous material may be positioned so that the composition comprising water or water vapour travels through or over the sorbent material. In some embodiments the composition comprising water and/or water vapour may flow through a channel and the hybrid ultramicroporous material may be provided along or within the channel.

In some preferred embodiments the hybrid ultramicroporous material is contacted with a composition comprising water or water vapour housed within a container. The container may comprise means for delivering gas and/or liquid to the container.

Suitably in step (b) the hybrid ultramicroporous material is at least partially immersed in the composition comprising water and/or water vapour.

In some embodiments the hybrid ultramicroporous material may be fully immersed in the composition comprising water or water vapour.

Suitably the hybrid ultramicroporous material is provided on a sorbent rotor which rotates portions of the hybrid ultramicroporous material into and out of contact with the composition comprising water or water vapour.

In some embodiments the method of the first aspect comprises a further step (c) desorbing water from the hybrid ultramicroporous material as water vapour. Suitably step (c) is performed after step (b).

Suitably desorption occurs when the hybrid ultramicroporous material is subjected to a stimulus, for example a change in humidity, a change in pressure or a change in temperature. In some embodiments this stimulus is provided by separating the hybrid ultramicroporous material from the liquid composition comprising water.

Desorption may occur on application of external energy. In some preferred embodiments desorption occurs upon a reduction in humidity and/or an increase in temperature.

Step (c) may involve contacting the hybrid ultramicroporous material with a gas stream, for example an air stream. In some preferred embodiments in step (c) air is allowed to flow over or through the hybrid ultramicroporous material or a stream of air is directed over or through the hybrid ultramicroporous material.

In preferred embodiments in step (c) the hybrid ultramicroporous material is subjected to an external stimulus such as vacuum or heated air to promote desorption.

In some embodiments, step (c) involves contacting the hybrid ultramicroporous material with warm air having a temperature of at least 30° C., suitably at least 40° C., suitably at least 50° C., for example at least 60° C.

Suitably the air used in step (c) has a temperature from 2° C. to 140° C., preferably from 20° C. to 100° C., for example from 25° C. to 90° C. or from 30° C. to 80° C.

Suitably the warm air has a temperature of from 35° C. to 100° C., suitably from 35° C. to 75° C. for example of from 40° C. to 80° C. or 50° C. to 70° C. For example, a source of "low grade heat" may advantageously be used to heat the air used for step (c), suitably in combination with an ambient air source.

The humidity of the warm air may not be especially important for the desorption step. Heated ambient air may suitably be used for step (c). However, in some embodiments, the warm air used in step (c) has a relative humidity of 30% or less, Suitably step (c) involves contacting the hybrid ultramicroporous material with air having a temperature of at least 40° C. and a relative humidity of 30% or less.

The inventors have found that step (c) of desorbing water from the hybrid ultramicroporous material as water vapour is particularly effective using heated air, as described further below. This may provide an overall efficient process for the capture and release of water which has improved performance compared to known sorbent materials. Furthermore, the process may make use of low grade heat and ambient air in the desorption step, which may contribute to the cost and energy efficiency of the process.

In some embodiments, step (c) involves applying a vacuum to the hybrid ultramicroporous material to desorb the water/water vapour. Suitably a vacuum having a pressure of 1 torr or below is applied, suitably of 0.1 torr or below. The vacuum applied to the hybrid ultramicroporous material in step (c) may be advantageously provided by readily available vacuum pump equipment.

In some embodiments in step (c) the hybrid ultramicroporous material is contacted with dry air, suitably having a humidity of less than 50 grains, preferably less than 30 grains, more preferably less than 20 grains. The grain unit will be known to the skilled person and is an absolute measure of how much water is present in 1 lb of air under any temperature condition.

Suitably during step (c) water molecules are desorbed as gaseous water molecules or water vapour.

Suitably the hybrid ultramicroporous material in its pure form desorbs at least 120 $cm^3$ water vapour/$cm^3$ material when subjected to a stimulus, for example a change in temperature or change in humidity. Suitably the hybrid ultramicroporous material desorbs at least 130 $cm^3$ water vapour/$cm^3$ material, for example at least 140 $cm^3$ water vapour/$cm^3$ material when subjected to a stimulus. Suitably the hybrid ultramicroporous material desorbs at least 150 $cm^3$ water vapour/$cm^3$ material when subjected to a stimulus.

Suitably the hybrid ultramicroporous material desorbs at least 20% of the captured water within 5 minutes under the conditions of heated air or vacuum as defined above. Suitably the hybrid ultramicroporous material desorbs at least 30%, for example at least 40%, of the captured water within 10 minutes under the conditions of heated air or vacuum as defined above. Suitably the hybrid ultramicroporous material desorbs at least 50% of the captured water within 1 hour under the conditions of heated air or vacuum as defined above.

Suitably in step (b) at least 5 wt % of water based on the weight of the hybrid ultramicroporous material, is captured in 5 minutes, suitably at least 10 wt %, for example at least 12 wt %, for example at least 13 wt % or at least 14 wt %.

The inventors have found that the use of the specified hybrid ultramicroporous materials provides superior water uptake performance compared to known water-sorbent materials such as Syloid® AI-1.

Suitably in the method of this first aspect at least 500 wt % of water per day based on the weight of the hybrid ultramicroporous material, is captured, suitably at least 1,000 wt % of water per day, for example at least 2,000 wt % of water per day.

Suitably the method of this first aspect captures (or "delivers") at least 17 L/kg of water per day, based on the weight of the hybrid ultramicroporous material, suitably at least 18 L/kg of water per day, for example at least 20 L/kg of water per day.

The inventors have found that the use of the specified hybrid ultramicroporous materials provides superior water delivery performance compared to known water-sorbent materials such as Syloid® AI-1.

The present invention suitably provides highly pure water vapour (or water after condensation of said water vapour) from the composition comprising water or water vapour without having to input the high energy necessary to achieve evaporation. Thus the present invention offers significant advantages over the methods of the prior art that involve evaporation as such methods are energy intensive and costly.

In some embodiments the method of the first aspect comprises a further step (d) of condensing the desorbed water vapour to provide liquid water. Suitably step (d) is performed after step (c).

The water vapour may condense without an external stimulus due to the temperature and/or humidity conditions of the environment present. In preferred embodiments the water vapour desorbed from the hybrid ultramicroporous material is condensed using an external stimulus.

Methods of condensing the water vapour to liquid water will be known by the person skilled in the art. For example the water vapour may be cooled or pressurised. Cooling may be active or passive.

In preferred embodiments sorption and desorption of water is reversible.

In especially preferred embodiments sorption and desorption are reversible over several cycles, suitably many cycles.

The water delivered from the hybrid ultramicroporous material is suitably ultra-high purity water. This water vapour is suitably condensed to provide ultra-high purity liquid water.

By ultra-high purity water we mean to refer to water without any contaminant species, such as organic and inorganic compounds and dissolved gases. Suitably there will be less than 100 ppm of contaminant species, suitably less than 50 ppm, for example less than 20 ppm. In some embodiments water comprising less than 10 ppm or less than 5 ppm contaminant species may be provided.

Therefore, in a second aspect, the present invention may provide a method of delivering water to a locus from a composition comprising water or water vapour, the method comprising the steps of:

(i) providing a hybrid microporous material of formula $[M(L)_a(X)_b]$;
(ii) contacting the hybrid microporous material with water or water vapour to capture water into the hybrid ultramicroporous material;
(iii) optionally transporting and/or storing the hybrid microporous material;
(iv) applying a stimulus to the hybrid microporous material to effect desorption of water retained therein; and
(v) collecting desorbed water at the locus;

wherein:

M is a metal species selected from zinc, cadmium, copper, magnesium, cobalt, nickel, calcium and iron;
L is a ligand comprising a N-containing heterocycle;
X is a halogen linking species;
a is from 0.5 to 3; and
b is from 1 to 3.

Suitably in the method of the second aspect, steps (i) to (v) are carried out sequentially in numerical order.

Where appropriate, the suitable features and advantages described in relation to the first aspect apply to this second aspect. Specifically, the hybrid microporous material of formula $[M(L)_a(X)_b]$ may have any of the suitable features and advantages described in relation to the first aspect. Step (ii) of contacting the hybrid microporous material with water or water vapour to capture water into the hybrid ultramicroporous material may have any of the suitable features and advantages described in relation to step (b) of the first aspect. Step (iv) of applying a stimulus to the hybrid microporous material to effect desorption of water retained therein may have any of the suitable features and advantages described in relation to step (c) of the first aspect.

According to a third aspect of the present invention there is provided a use of a hybrid ultramicroporous material of formula $[M(L)_a(X)_b]$ to capture water or water vapour from a composition comprising water or water vapour; wherein M is a metal species selected from zinc, cadmium, copper, magnesium, cobalt, nickel, calcium and iron; L is a ligand comprising a N-containing heterocycle; X is a halogen linking species; a is from 0.5 to 3 and b is from 1 to 3.

The hybrid ultramicroporous material is as described in relation to the first aspect.

Suitably in the use according to the third aspect at least 5 wt % of water based on the weight of the hybrid ultramicroporous material, is captured in 5 minutes, suitably at least 10 wt %, for example at least 12 wt %, for example at least 13 wt % or at least 14 wt %.

The use of this third aspect to capture water or water vapour from a composition comprising water or water vapour suitably involves desorbing the captured water or water vapour from the hybrid microporous material, suitably using heated air or vacuum, as described above in relation to the first aspect. For example, desorbing the captured water or water vapour may involve using air having a temperature of at least 40° C., e.g. 40-80° C. Alternatively, desorbing the captured water or water vapour may involve applying a vacuum to the hybrid ultramicroporous material having a pressure of 0.1 torr or below.

The inventors have found that the use of the specified hybrid ultramicroporous materials provides superior water uptake performance compared to known water-sorbent materials such as Syloid® AI-1.

Suitably in the use according to the third aspect at least 500 wt % of water per day based on the weight of the hybrid ultramicroporous material, is sorbed, suitably at least 1,000 wt % of water per day, for example at least 2,000 wt % of water per day.

Suitably in the use according to the third aspect at least 17 L/kg of water per day is captured (or "delivered"), based on the weight of the hybrid ultramicroporous material, suitably at least 18 L/kg of water per day, for example at least 20 L/kg of water per day.

The inventors have found that the use of the specified hybrid ultramicroporous materials provides superior water delivery performance compared to known water-sorbent materials such as Syloid® AI-1.

According to a fourth aspect of the present invention there is provided a device for capturing water from a composition comprising water, the device comprising a hybrid ultramicroporous material of formula $[M(L)_a(X)_b]$ and a support; wherein M is a metal species selected from zinc, cadmium, copper, magnesium, cobalt, nickel, calcium and iron; L is a ligand comprising a N-containing heterocycle; X is a halogen linking species; a is from 0.5 to 3 and b is from 1 to 3.

The methods of the first and second aspects and the use of the third aspect are suitably performed on a device of the fourth aspect.

The device according to the fourth aspect comprises a hybrid ultramicroporous material and support as previously defined in relation to the first aspect.

Suitably the device comprises means for directing air flow through or across the hybrid ultramicroporous material.

In some embodiments the device may be electrically powered. Suitably it may be powered by renewable resources, for example solar power.

The device may optionally be used for water storage.

The device may optionally be used for water delivery.

Suitably the device may further comprise means for desorbing water from the hybrid ultramicroporous material.

Such means may suitably comprise means for exposing the hybrid ultramicroporous material to a temperature change and/or a pressure change.

The water delivered from the hybrid ultramicroporous material is suitably ultra-high purity water.

By ultra-high purity water we mean to refer to water substantially free of contaminant species, such as organic and inorganic compounds and dissolved gases.

In some embodiments the water delivered from the hybrid ultramicroporous material may be gaseous ultra-high purity water.

Preferably the water delivered from the hybrid ultramicroporous material is liquid ultra-high purity water.

Suitably the water delivered from the hybrid ultramicroporous material may undergo treatment to make the water suitable for its specific use.

The water delivered from the hybrid ultramicroporous material may be used for drinking water. In such use, the water may involve a treatment step to make the water suitable for human consumption.

The water delivered from the hybrid ultramicroporous material may be used in agriculture.

The water delivered from the hybrid ultramicroporous material may be used in medical applications.

The water delivered from the hybrid ultramicroporous material may be used in industrial applications.

In some embodiments the device of the fourth aspect may be a dehumidifier for use in dehumidification.

In some embodiments the device of the fourth aspect may be desalination device for use in desalination. In some embodiments, the device is a sorbent rotor device comprising a rotatable cartridge which contains the hybrid ultramicroporous material and the support. The cartridge suitably has an annular shape and a through-hole to receive a shaft about which the cartridge is able to rotate, in the sorbent rotor device. In such a sorbent rotor device, the cartridge, and therefore the hybrid ultramicroporous material and the support contained within it, are movable between a first position and a second position. The first position may be a sorption position wherein water can be captured into the hybrid ultramicroporous material and the second position may be a desorption position wherein water (i.e. water vapour) can be desorbed from the sorbent material.

Suitably the device comprises a motor adapted to rotate the cartridge about its central axis, between the first and second position.

Suitably the cartridge is adapted to allow the liquid or gaseous composition comprising water or water vapour to flow across or through the cartridge.

Suitable sorbent rotor devices are known in the art. For example, the sorbent rotor device may be configured to remove water vapour from an incoming stream of air. Therefore the sorbent rotor device may be configured for dehumidification. Alternatively, the sorbent rotor device may be configured to remove water from an aqueous composition, for example seawater, and may therefore be configured for a method of desalination or water purification.

EXAMPLES

The invention will now be further described by reference to the accompanying figures and examples.

In the following examples, powder X-ray diffraction (PXRD) diffractograms were recorded using a PANalytical Empyrean™ diffractometer equipped with a PIXcel3D detector operating in scanning line detector mode with an active length of 4 utilizing 255 channels. The diffractometer is fitted with an Empyrean Cu LFF (long fine-focus) HR (9430 033 7310x) tube operated at 40 kV and 40 mA and CuKα radiation ($\lambda\alpha$=1.540598 Å) was used for diffraction experiments. Continuous scanning mode with the goniometer in the theta-theta orientation was used to collect the data. Incident beam optics included the Fixed Divergences slit with anti-scatter slit PreFIX module, with a ⅛° divergence slit and a ¼° anti-scatter slit, as well as a 10 mm fixed incident beam mask and a Soller slit (0.04 rad). Divergent beam optics included a P7.5 anti-scatter slit, a Soller slit (0.04 rad), and a Ni-β filter. In a typical experiment, 25 mg of sample was dried, ground into a fine powder and was loaded on a zero background silicon disks. The data was collected from 5°-40° (26) with a step-size of 0.01313030 and a scan time of 30 seconds per step. Crude data were analyzed using the X'Pert HighScore Plus™ software V 4.1 (PANalytical, The Netherlands)

Single crystal X-ray diffraction (SCXRD) measurements were collected using a Bruker Quest diffractometer equipped with a CMOS detector and IμS microfocus X-ray source (Cu Kα, λ=1.54178 Å). In all cases, data was indexed, integrated and scaled in APEX3. Absorption correction was performed by multiscan method using in SADABS. Space group was determined using XPREP implemented S3 in APEX3. Structures were solved using intrinsic phasing method (SHELXT) and refined on F2 using nonlinear least-squares techniques with SHELXL programs. Anisotropic thermal parameters were applied to all non-hydrogen atoms. All the hydrogen atoms were generated geometrically. The substitute —NH2 in ROS-040 are disordered in two positions because of high-symmetry space group. The guest water molecules in ROS-039 and ROS-040 are disordered. The occupancies for all the disordered atoms were refine in SHELX using PART commands with free variables.

Thermogravimetric analysis (TGA) thermograms were recorded under nitrogen using TGA instrument TA Q50 V20.13 Build 39. Platinum pans and a flow rate of 60 $cm^3$ $min^{-1}$ for the nitrogen gas were used for the experiments. The data was collected in the High Resolution Dynamic mode with a sensitivity of 1.0, a resolution of 4.0, and a temperature ramp of 25° C. min-1 up to 500° C. The data was evaluated using the T.A. Universal Analysis suite for Windows XP/Vista Version 4.5A.

Fourier Transform Infrared (FT-IR) spectra were obtained using a Nicolet Avatar 360 FT-IR spectrophotometer.

Water vapour sorption studies described below involved either vacuum dynamic vapour sorption (DVS) making use of a Surface Measurement Systems DVS Vacuum, which gravimetrically measures the uptake and loss of vapour, or dynamic vapour sorption using air as a carrier gas (Surface Measurement Systems DVS Adventure). The DVS methods were used for the determination of water vapour sorption isotherms using approximately 10 mg of sample. Pure water was used as the adsorbate for these measurements and temperature was maintained at 298 K by enclosing the system in a temperature-controlled incubator. The mass of the sample was determined by comparison to an empty reference pan and recorded by a high resolution microbalance with a precision of 0.1 μg.

For vacuum DVS tests, the minimum and maximum equilibration time for each step were 10 and 300 min, respectively. Vacuum pressure transducers were used with ability to measure from $1\times10^{-6}$ to 760 Torr with a resolution of 0.01%.

For the kinetic tests conducted using vacuum DVS described below, each degassed sample was exposed to 30% relative pressure of water vapor at 298 K until reaching the equilibration criteria (dM/dT=0.1%/min); after that the sample was desorbed at 298 K under vacuum to reach the same equilibration criteria (dM/dT=0.1%/min).

For the vacuum swing recyclability tests described below, a program of fixed time and humidity (5 min adsorption at 30% humidity+5 min desorption under vacuum) was used. The same adsorption-desorption cycle was repeated 100 times for each sample. The vacuum applied in this program was around 0.05-0.1 torr.

Example 1: Synthesis of [Zn(1,2,4-triazole)F] (ROS-39)

$ZnF_2 \cdot 4H_2O$ (175 mg, 1 mmol) and 1,2,4-triazole (69 mg, 1 mmol) were mixed in water (10 ml). This mixture was stirred for 10 min. The solution was then placed in an oven heated to 160° C. Large needle-shaped single crystals were obtained after 3 days.

Example 2: Structure of [Zn(1,2,4-triazole)F]

Figure 1B:
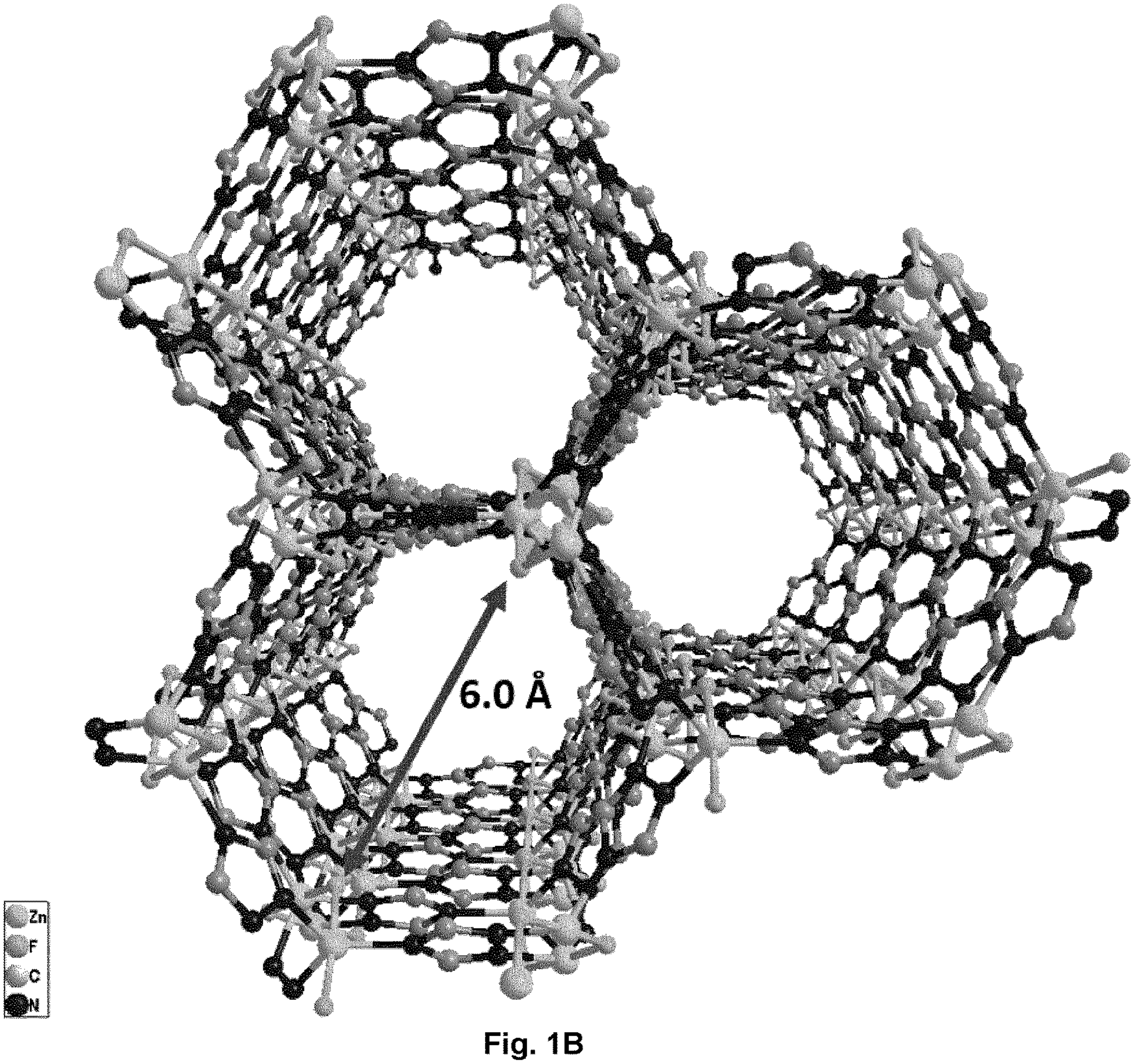
FIG. 1B: Crystallographic structure of [Zn (1,2,4-triazole) F] showing the pore size of the channel formed.
Figure 2:
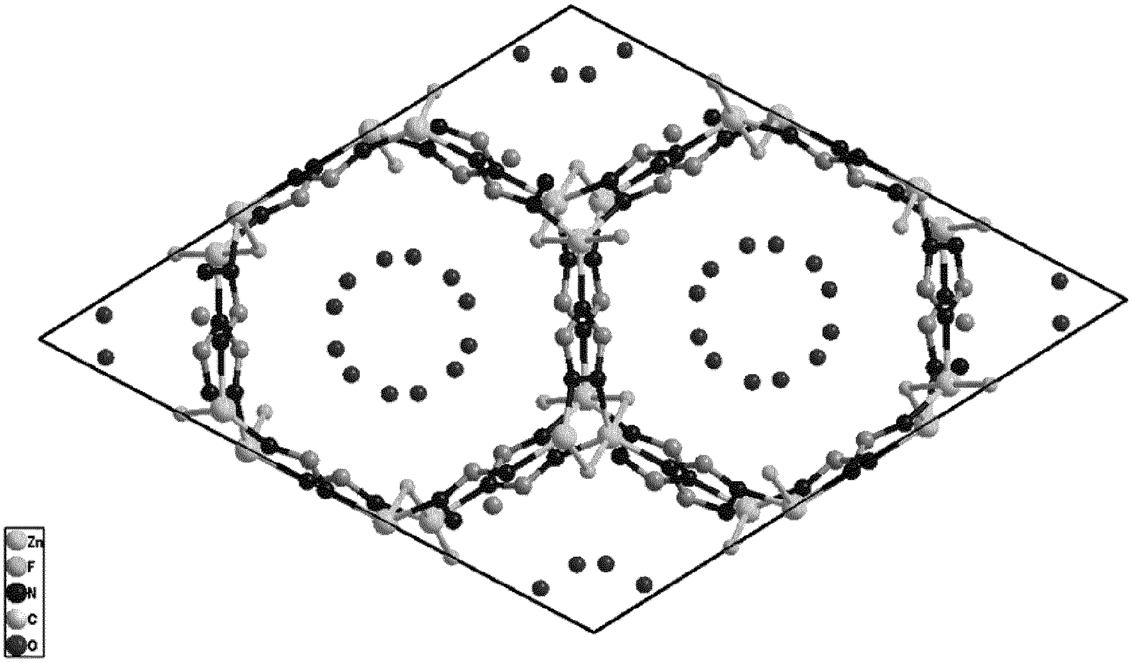
FIG. 2: Crystallographic structure of the unit cell of [Zn (1,2,4-triazole) F] showing solvated water molecules.

FIGS. 1A and 1B show the crystallographic structure of this compound. [Zn(1,2,4-triazole)F] forms a three-dimensional framework with the Zn—F—Zn-bridged rob building block connected by 1,2,4-triazole to form the one dimensional channel shown in FIG. 1A. The pore size of the channel is approximately 6.0 Å, as shown in FIG. 1B. The synthesised phase contained approximately 36 solvated water molecules in the unit cell, as displayed in FIG. 2.

Example 3: Water Vapour Sorption Studies of [Zn(1,2,4-triazole)F]

Figure 3A:
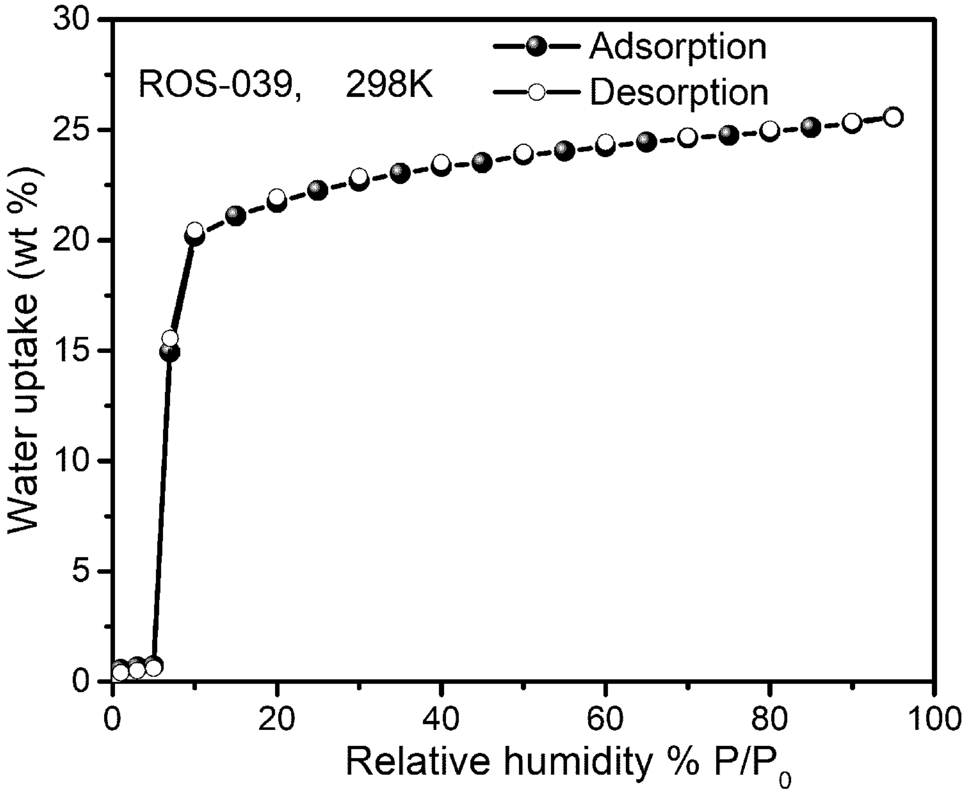
FIG. 3A: Graph showing water sorption isotherms for [Zn (1,2,4-triazole) FL.
Figure 3B:
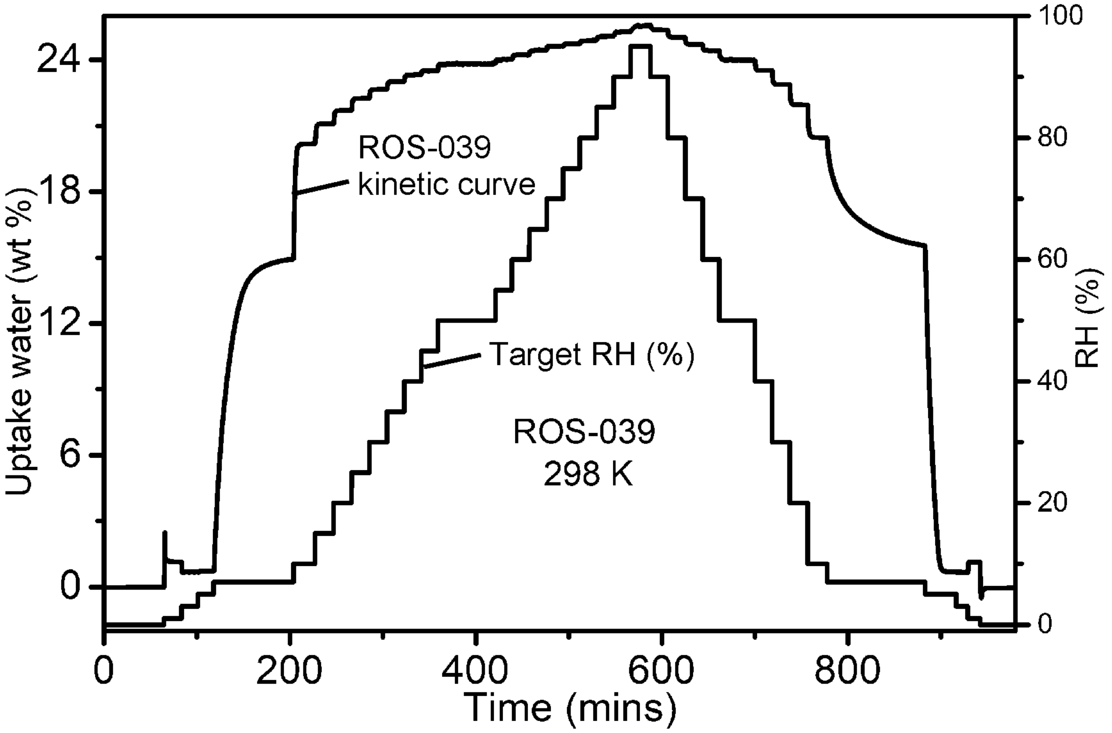
FIG. 3B: Graph showing water sorption isotherms for [Zn (1,2,4-triazole) Fl.

Water sorption isotherms for [Zn(1,2,4-triazole)F]were collected at 25° C. using dynamic vapor sorption (DVS) equipment, as shown in FIG. 3A and FIG. 3B respectively. These isotherms reveal sudden switching from empty to water loaded phases without hysteresis. This type of isotherm is rare but highly desirable for water capture and release.

Example 4: Kinetic Tests of [Zn(1,2,4-triazole)F]

Figure 4:
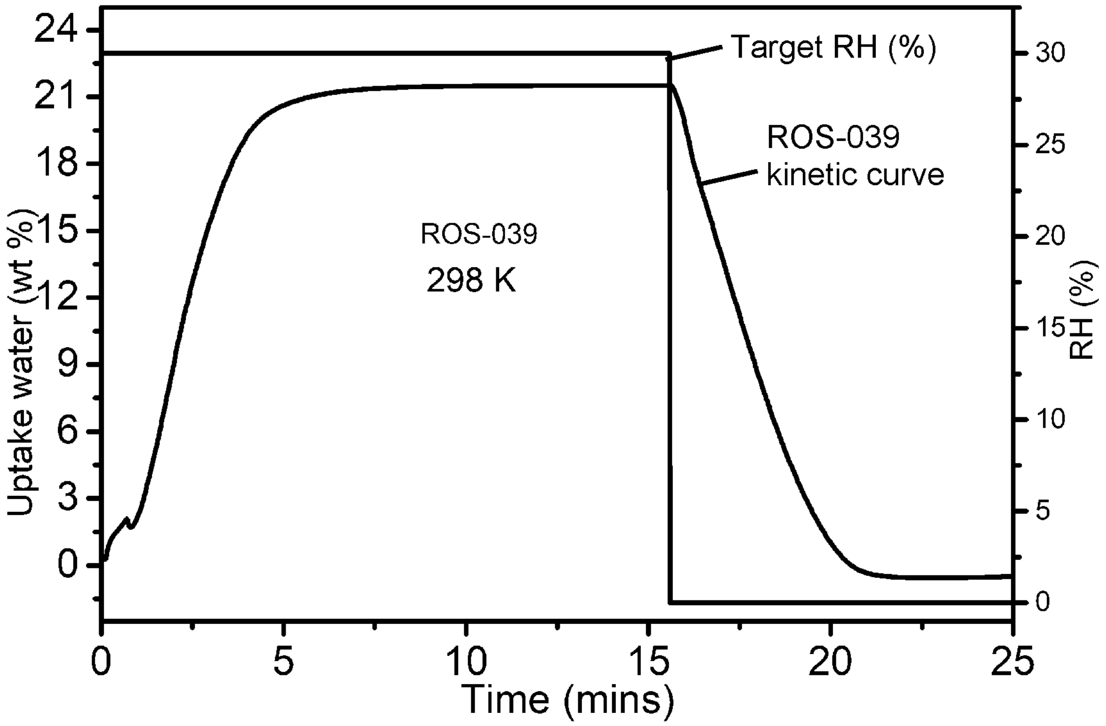
FIG. 4: Graph showing water sorption and desorption kinetics for [Zn (1,2,4-triazole) F].

Water sorption and desorption kinetics were measured for [Zn(1,2,4-triazole)F] at 25° C., as shown in FIG. 4. The kinetic data in FIG. 4 shows that the adsorption and desorption steps approximately take 5 min and 5 min, respectively. The removal of water from the structure does not require any additional heating upon reducing relative humidity, as evidenced by the mass returning to its original value at 0% relative humidity.

Example 5: Recyclability Tests of [Zn(1,2,4-triazole)F]

Figure 5:
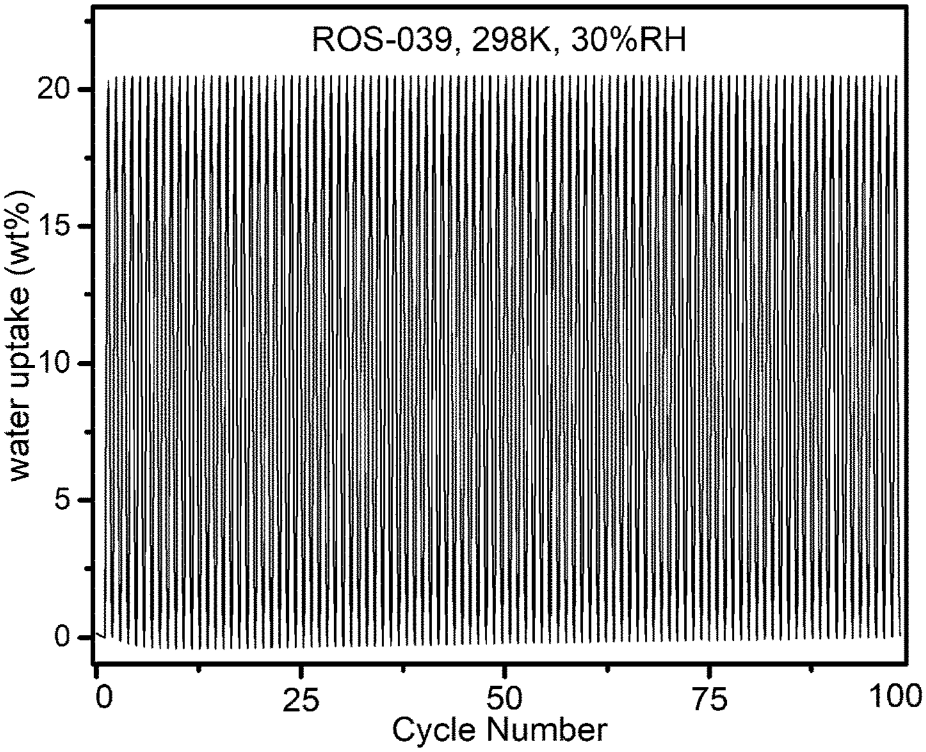
FIG. 5: Graph showing recyclability test results for [Zn (1,2,4-triazole) F].

100 cycles of adsorption and desorption at 25° C., as described in example 4 were performed. The results are shown in FIG. 5. Reversible switching isotherms were observed with no detectable retain gap, indicating water desorption is not obstructed. [Zn(1,2,4-triazole)F]shows a high working adsorption capacity in the low partial pressure range (≤30% P/Po) of 30.24 L/Kg per day.

Example 6: Scale-Up Synthesis of [Zn(1,2,4-triazole)F]

Figure 6:
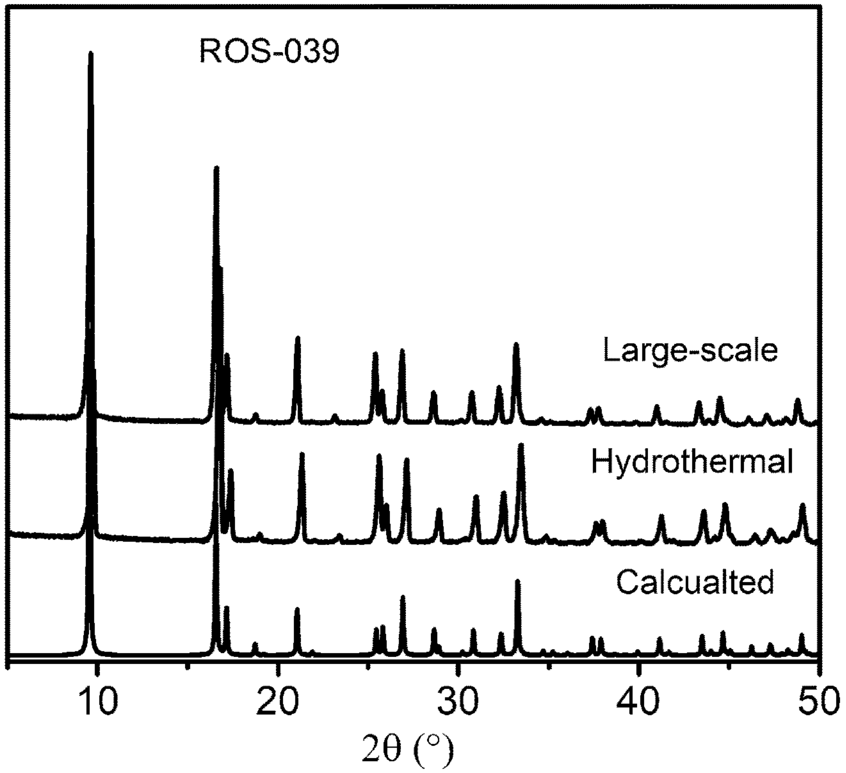
FIG. 6: PXRD characterisation of the product of Example 6.

[Zn(1,2,4-triazole)F]can be produced on a several hundred gram scale by a water slurry method as follows: 750 ml of water was added to a 1 L reactor with a stirrer set to 900 rpm under room temperature. $ZnF_2 \cdot 4H_2O$ (175 g, 1 mol) and 1,2,4-triazole (69 g, 1 mol) were added to the reactor. The mixture was allowed to stir for 5 h. Once the reaction was complete, the solution was filtered to obtain the solid product, which was further washed thoroughly with water to remove any unreacted starting materials, and then air-dried. Yield=220 g, >90%. Characterisation of the product by PXRD, as shown in FIG. 6, confirmed this to be isostructural to the product obtained in Example 1.

Example 7: Synthesis of [Zn(3-amino-1,2,4-triazole)F] (ROS-40)

$ZnF_2 \cdot 4H_2O$ (175 mg, 1 mmol) and 3-amino-1,2,4-triazole (84 mg, 1 mmol) were mixed in water (10 ml). This mixture was stirred for 10 min. The solution was then placed in an oven heated to 160° C. Large needle-shaped single crystal were obtained after 3 days.

Example 8: Structure of [Zn(3-amino-1,2,4-triazole)F]

Figure 7A:
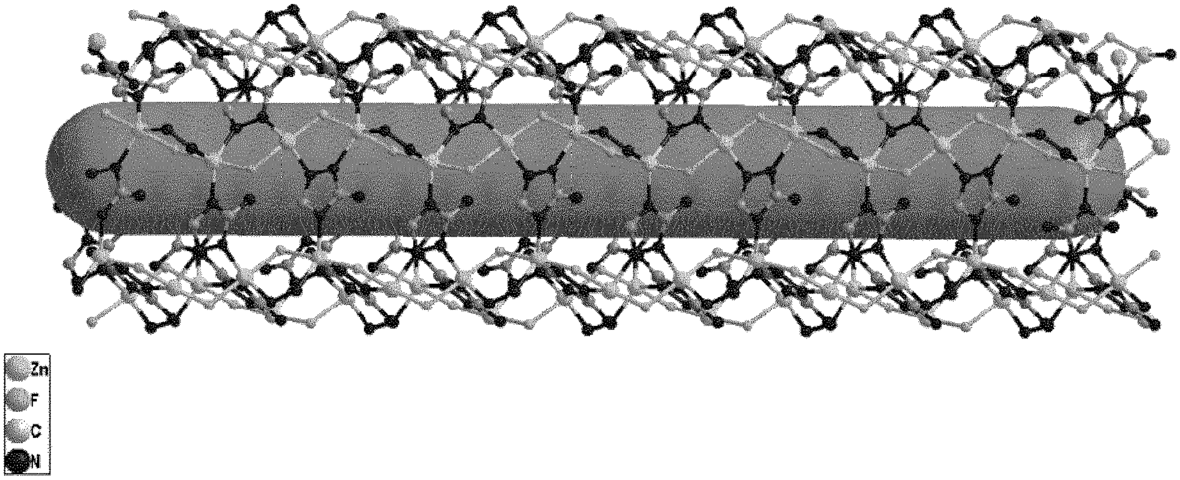
FIG. 7A: Crystallographic structure of [Zn (3-amino-1,2,4-triazole) F] showing the one dimensional channel formed.
Figure 7B:
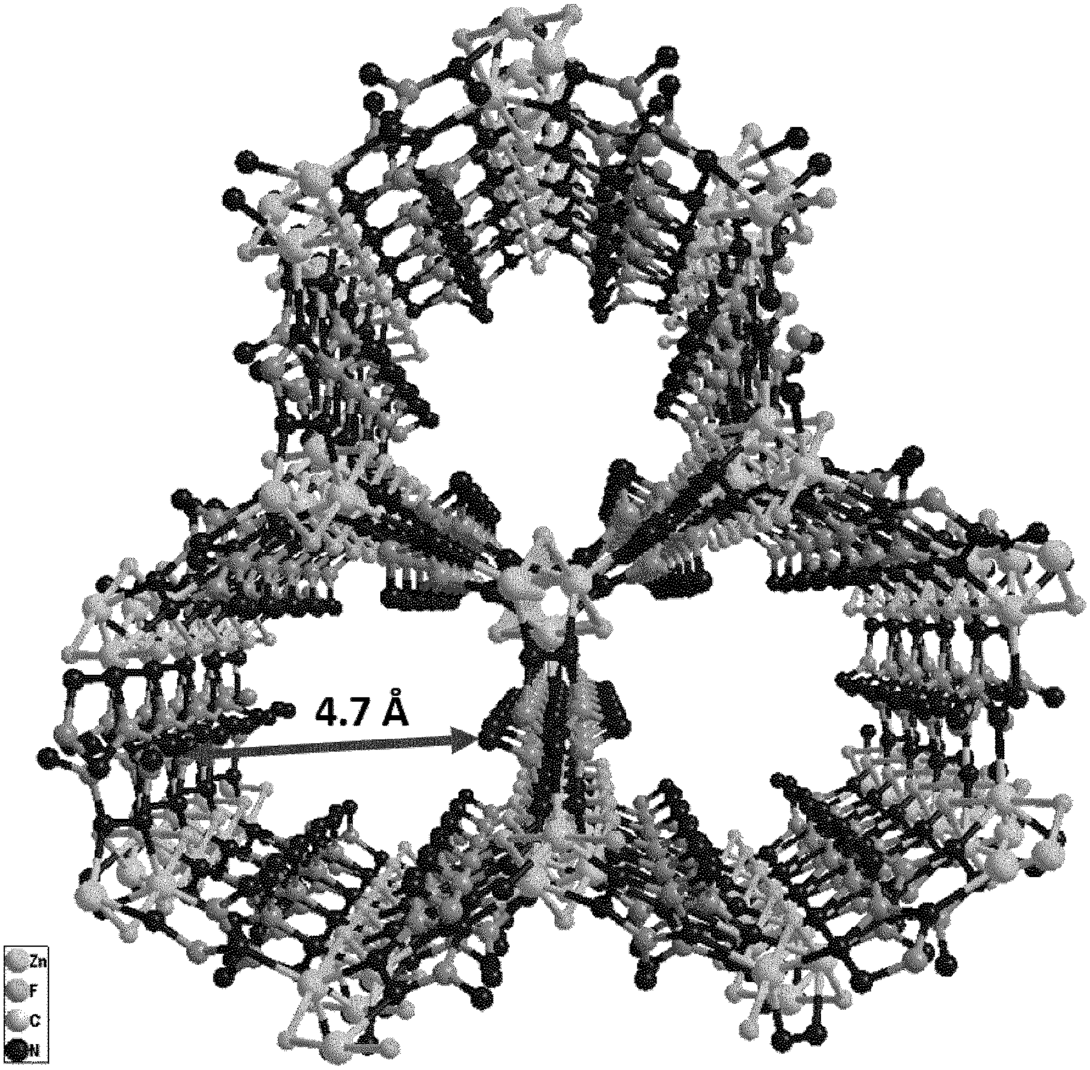
FIG. 7B: Crystallographic structure of [Zn (3-amino-1,2,4-triazole) F] showing the pore size of the channel formed.

FIGS. 7A and 7B shows the crystallographic structure of this compound. [Zn(3-amino-1,2,4-triazole)F] forms a three-dimensional framework with Zn—F—Zn-bridged rod building blocks connected by 3-amino-1,2,4-triazole to form the one dimensional channel shown in FIG. 7A. The pore size of the channel is approximately 4.7 Å, as shown in FIG. 7B. The synthesised phase contained approximately 24 solvated water molecules in the unit cell.

Example 9: Water Vapour Sorption Studies of [Zn(3-amino-1,2,4-triazole)F]

Figure 8A:
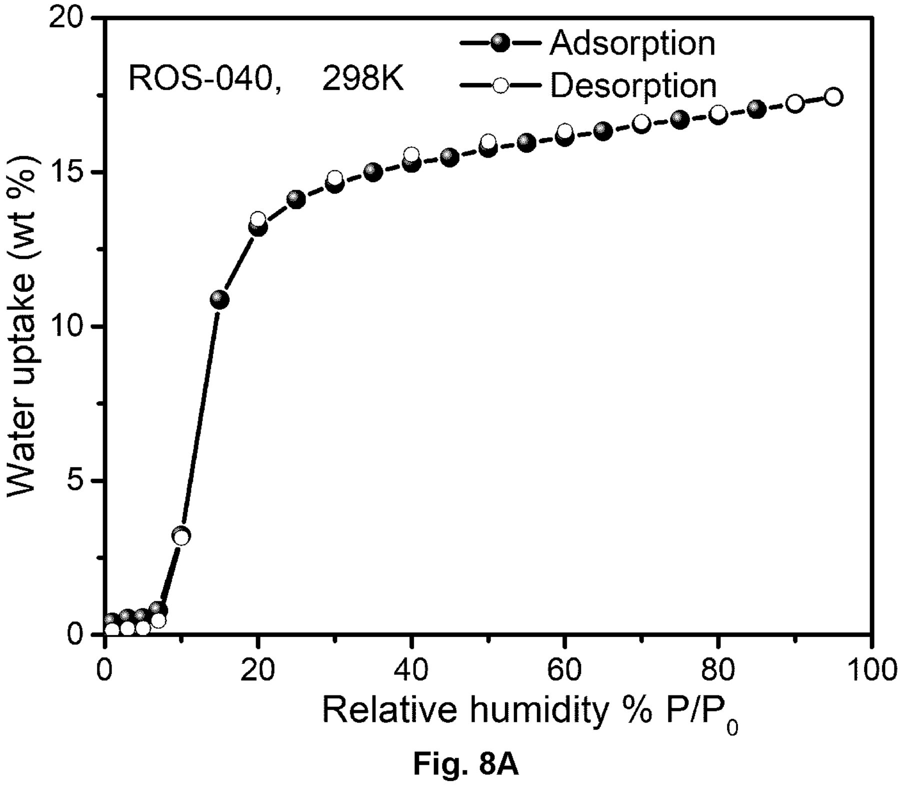
FIG. 8A: Graph showing water sorption isotherms for [Zn (3-amino-1,2,4-triazole) F].
Figure 8B:
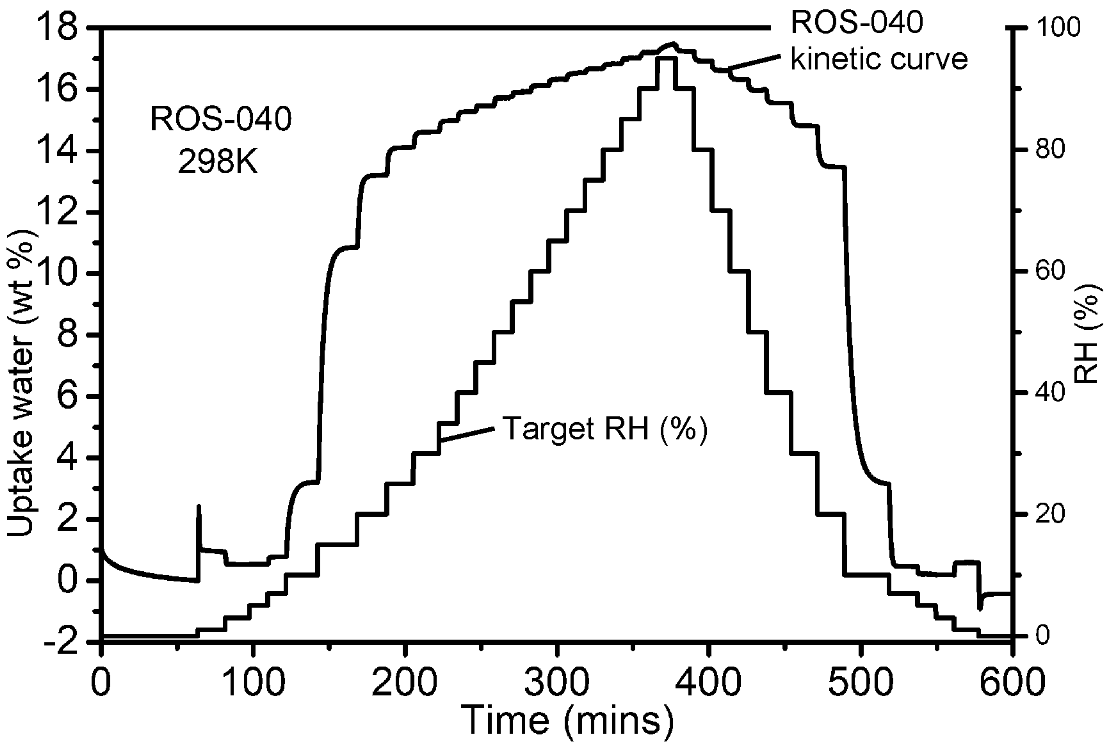
FIG. 8B: Graph showing water sorption isotherms for [Zn (3-amino-1,2,4-triazole) F].

Water sorption isotherms for [Zn(3-amino-1,2,4-triazole) F]were collected at 25° C. using dynamic vapor sorption (DVS) equipment, as shown in FIG. 8A and FIG. 8B, respectively. These isotherms reveal sudden switching from empty to water loaded phases without hysteresis. This type of isotherm is rare but highly desirable for water capture and release.

Example 10: Kinetic Tests of [Zn(3-amino-1,2,4-triazole)F]

Figure 9:
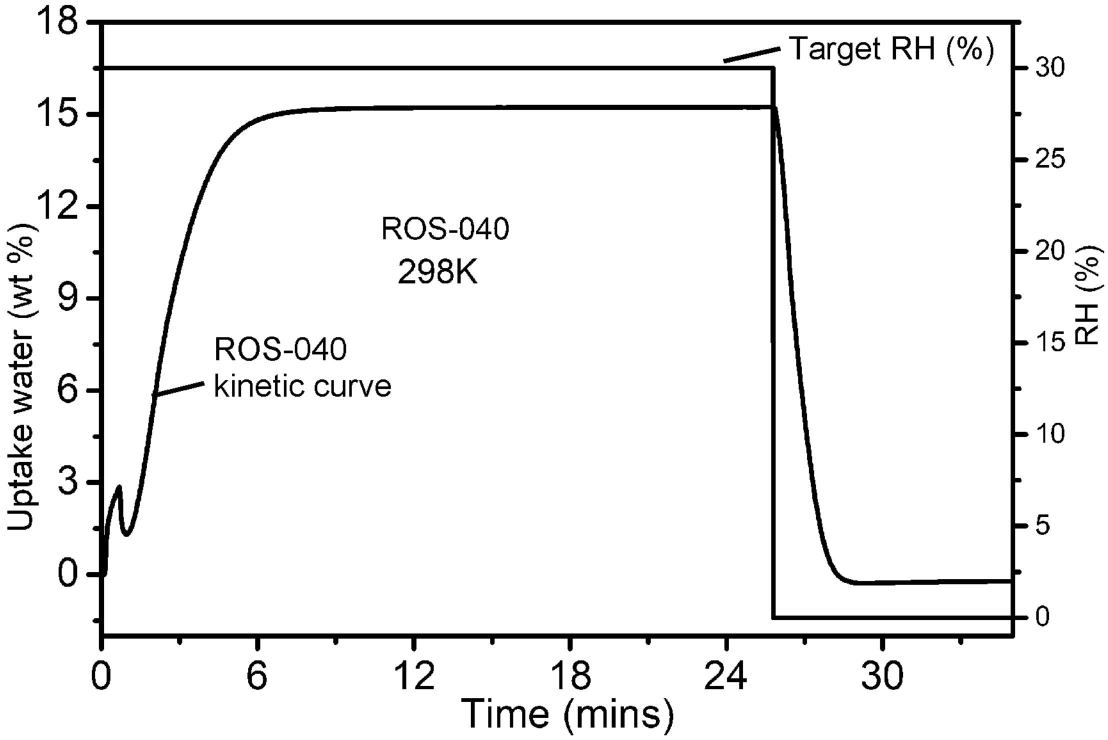
FIG. 9: Graph showing water sorption and desorption kinetics for [Zn (3-amino-1,2,4-triazole) F].

Water sorption and desorption kinetics were measured for [Zn(3-amino-1,2,4-triazole)F] at 25° C., as shown in FIG. 9. The kinetics data in FIG. 9 shows that the adsorption and desorption takes approximately 15 min and 10 min, respectively. The removal of water from the structure does not require any additional heating upon reducing relative humidity, as evidenced by the mass returning to its original value at 0% relative humidity.

Example 11: Recyclability Tests of [Zn(3-amino-1,2,4-triazole)F]

Figure 10:
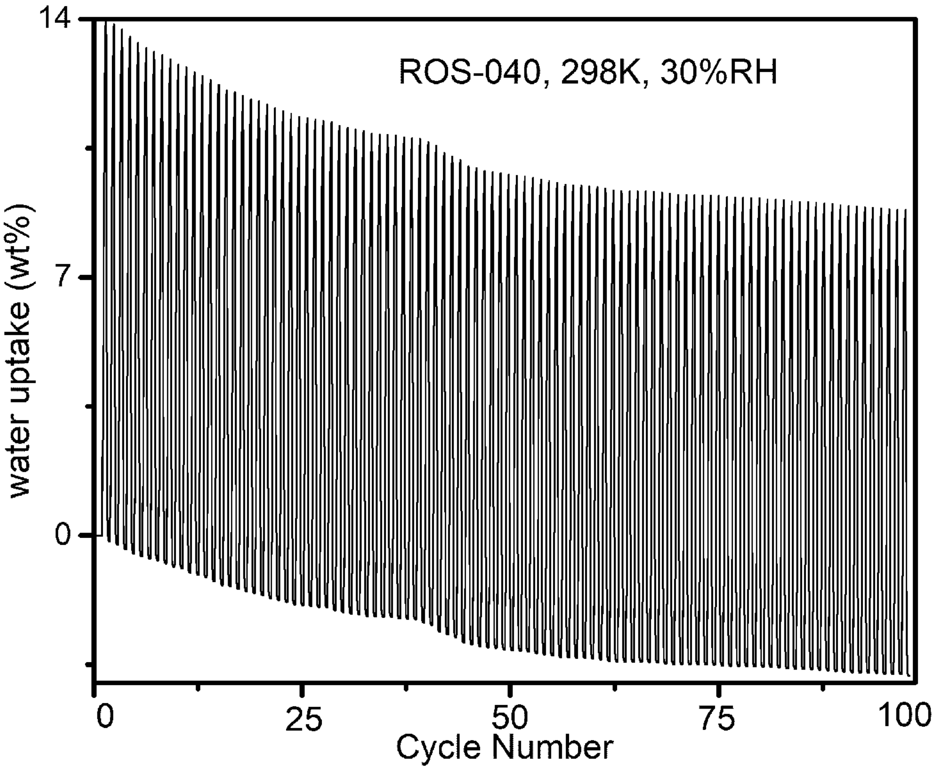
FIG. 10: Graph showing recyclability test results for [Zn (3-amino-1,2,4-triazole) F].

One hundred cycles of adsorption and desorption at 25° C., as described in example 10, were performed in total. The results are shown in FIG. 10. Reversible switching isotherms were observed with no detectable hysteresis gap. [Zn(3-amino-1,2,4-triazole)F] shows a high working adsorption capacity in the low partial pressure range (≤30% P/Po) of 20.16 L/Kg per day. The downward trend of this graph is believed to be due to some loss of the powdered sample of ROS-040 during each cycle of the experiment. However, this does not affect the performance of the remaining material with the % changes in capture and release cycles remaining consistent.

Example 12: Scale-Up Synthesis of [Zn(3-amino-1,2,4-triazole)F]

Figure 11:
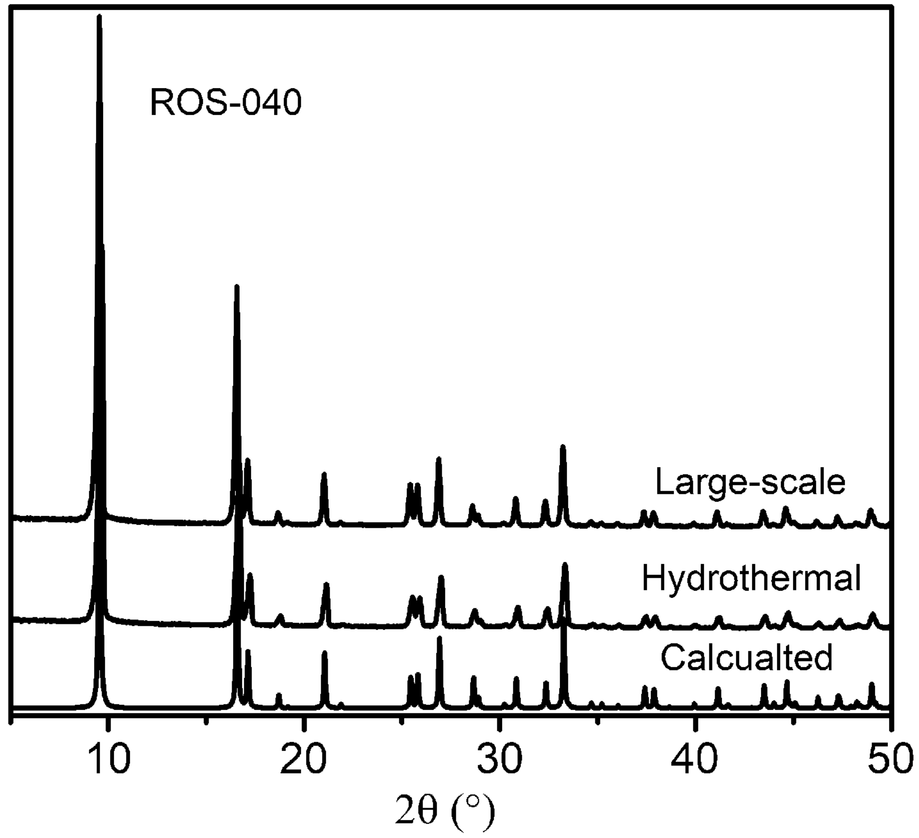
FIG. 11: PXRD characterisation of the product of Example 12.

ROS-040 can be produced in more than one hundred gram scale by slurry method as follows: 500 ml of water was added to a 1 L reactor with a stirrer set to 800 rpm under room temperature. $ZnF_2 \cdot 4H_2O$ (87.5 g, 0.5 mol) and 3-amino-1,2,4-triazole (42 g, 0.5 mol) were added to the reactor. The mixture was allowed to stir for 5 h. Once the reaction was complete, the solution was filtered to obtain the solid product, which was further washed thoroughly with water to remove any unreacted starting materials, and then air-dried. Yield=130 g, >90%. The PXRD pattern in FIG. 11 demonstrates that the structure of the bulk sample matches with the obtained single-crystal structure.

Example 13: Comparison with Syloid® AI-1

Figure 12:
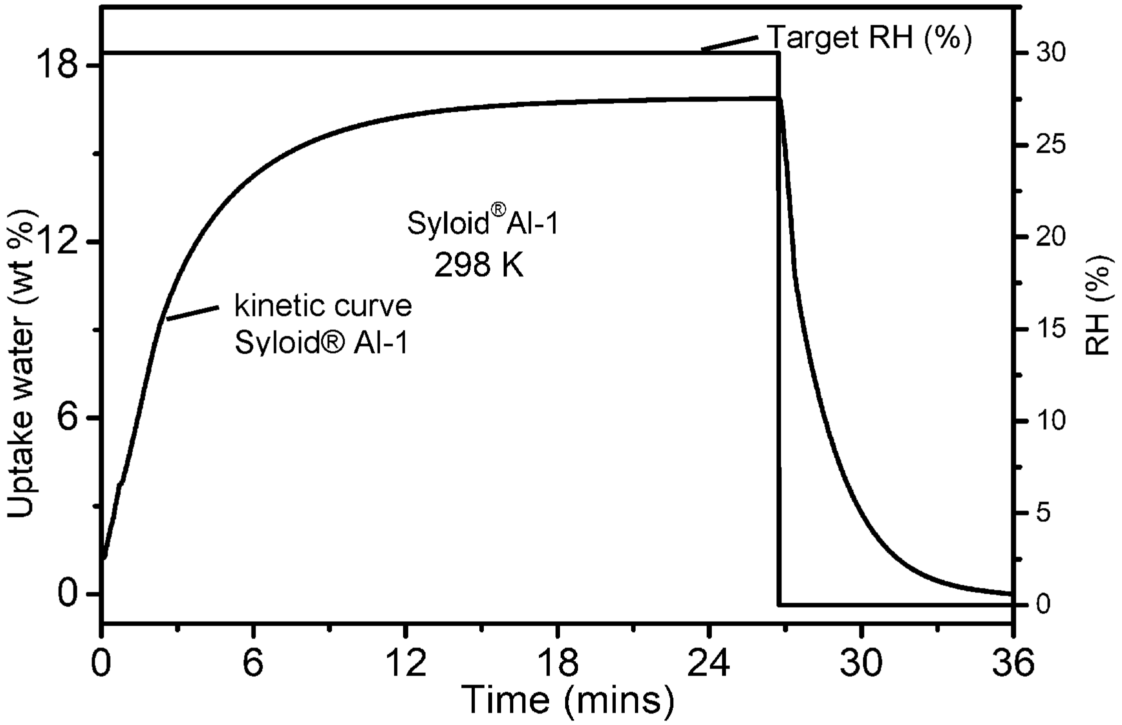
FIG. 12: Graph showing water sorption and desorption kinetics for Syloid® Al-1.

Water sorption and desorption kinetics were measured for Syloid® AI-1, as a comparative example. Syloid® AI-1 is an industry standard silica gel water-sorbent material commonly used in dehumidifiers. FIG. 12 shows that at 30% RH Syloid® AL-1 takes approximately 15 minutes to load to its capacity of approximately 16 wt % and approximately 10 minutes to unload.

Example 14: Water Uptake and Deliverability Using Vacuum Swing

The recyclability tests described above were performed on the comparative example Syloid® AI-1 project performance using a vacuum swing method (30% RH for capture, 0% RH for release). The data obtained were used, along with the recyclability test data for [Zn(1,2,4-triazole)F] (ROS-039) and [Zn(3-amino-1,2,4-triazole)F] (ROS-040), to calculate the uptake of water (wt %) (within the allotted 5 minute adsorption window) and the deliverability of water (L/(Kg-d)) over time for each of the these materials. The results are shown in Table 1 below.

TABLE 1

Vacuum swing performance comparisons

| Sorbent | Adsorption (min) | Desorption (min) | Uptake (wt %) (at 298K) | Deliverability (L/(Kg · d)) |
|---|---|---|---|---|
| ROS-039 | 5 | 5 | 21 | 30.24 |
| ROS-040 | 5 | 5 | 14 | 20.16 |
| Syloid ® AI-1 | 5 | 5 | 11.5 | 16.56 |

As can be seen from Table 1, both ROS-039 and ROS-040 used in the present invention show superior uptake and deliverability compared to Syloid® AI-1. Therefore by utilising these superior water adsorption and desorption properties of these specific hybrid ultramicroporous materials, the present invention may provide an improved method of water capture and an improved water capture device, such as dehumidifier or a desalination device. The methods and device of the present invention may therefore provide purified water more efficiently than current methods, reducing the cost and environmental impact of obtaining water in this way, for example from air or from salted water.

Example 15: Temperature Swing Performance Using DVS Adventure

Temperature swing experiments were conducted to investigate the performance of ROS-039 compared to Syloid® AI-1 when the desorption of water from the sorbent material is stimulated by application of heat. Fast adsorption-desorption cycling is critical for practical applications, e.g. desiccant wheels, but cannot be performed using in-house instruments due to the high thermal inertia of the furnace used in these instruments. Therefore the cycling was calculated by combining adsorption steps at 27° C. and desorption steps at 60° C. By combining adsorption and desorption curves, temperature swing performance can be projected as the limitations of slow heating/cooling of a laboratory furnace are mitigated.

While it is expected that using heat during the desorption step will speed up the rate of desorption, the actual effect of the temperature on the rate of desorption cannot be predicted. This is because the activation energy depends on the energy difference between the loaded state and the transition state, a parameter that cannot be readily determined in the absence of a series of in situ physicochemical tests.

These temperature swing experiments were carried out by DVS using a Surface Measurement Systems DVS Adventure, which gravimetrically measures the uptake and loss of vapour during adsorption and desorption, respectively. The DVS studies used 5 mg of sample. Pure water was used as the adsorbate for these measurements and air was used as the carrier gas. The mass of the sample was determined by comparison to an empty reference pan and recorded by a high resolution microbalance with a precision of 0.1 μg. The minimum and maximum equilibration time for each step were 10 and 360 min, respectively. Each degassed sample of sorbent material was exposed to 30% relative pressure of water vapor at different temperatures (27, 40, 50 and 60° C.) until equilibration was reached (dM/dT=0.05%/min); the sample was then desorbed at 0% RH at 27, 40, 50 and 60° C., respectively.

Figure 13:
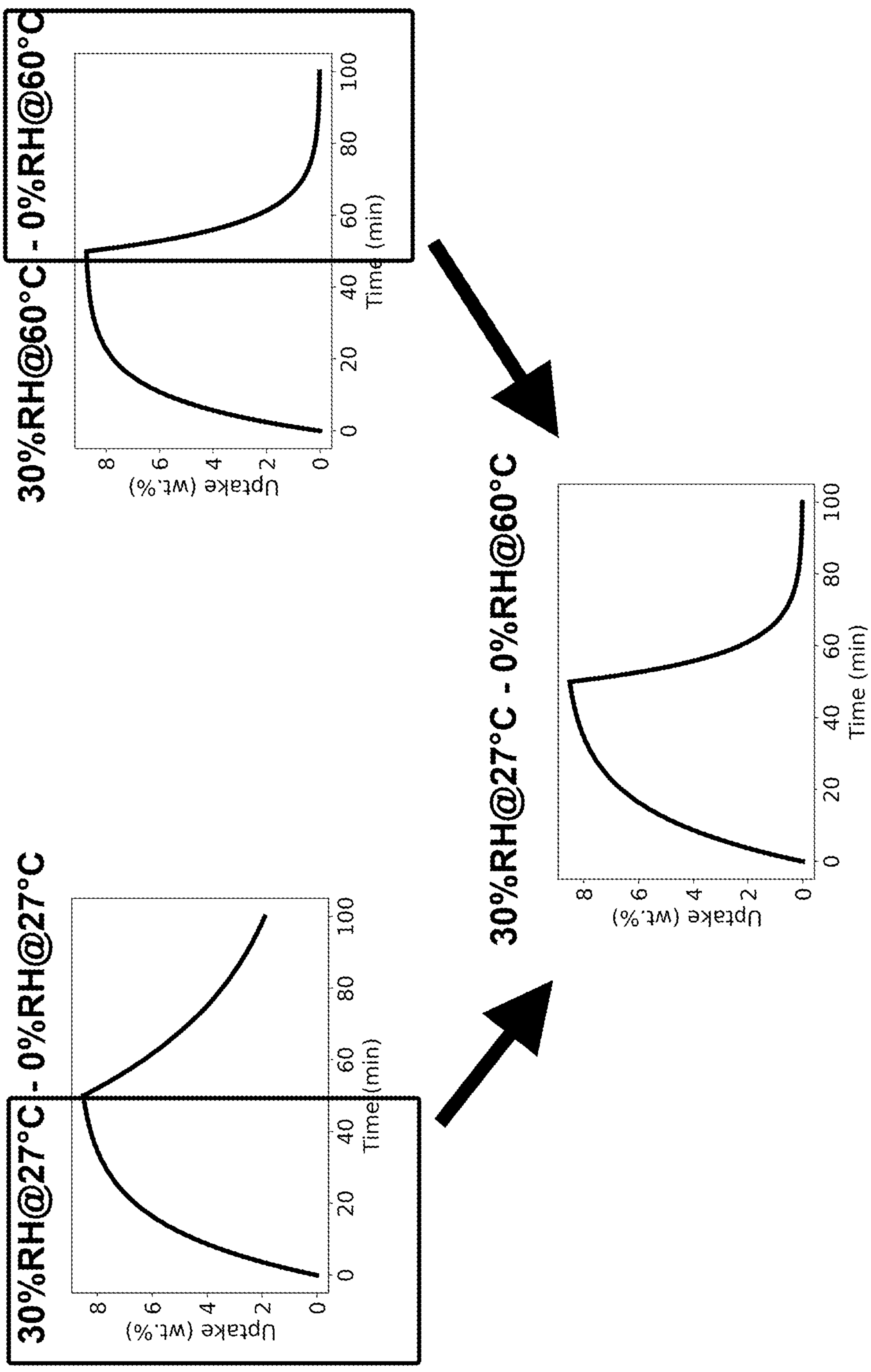
FIG. 13: Diagram showing calculation of temperature swing performance by combining adsorption steps at 27° C. and desorption steps at 60° C.

This data was used to calculate temperature swing performance by combining adsorption steps at 27° C. and desorption steps at 60° C. as shown in FIG. 13. This allowed us to compare temperature swing cycling performance for ROS039 (upper traces) and Syloid® AI-1 (lower traces) over different adsorption and desorption times shown in FIG. 14. These results unexpectedly revealed that the effect of temperature on the rate of desorption is proportionately much larger for ROS-039 than for Syloid® AI-1.

Figure 15:
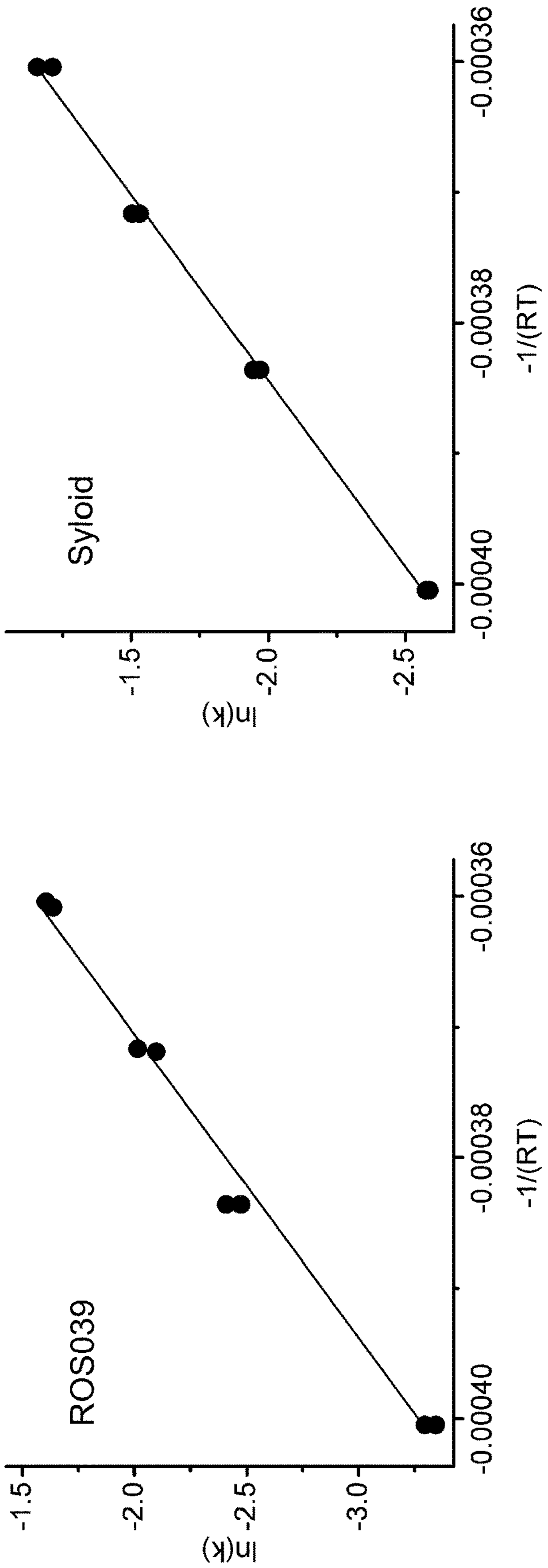
FIG. 15: A series of graphs showing the Ln (k) vs.-1/(RT) fits used for calculation of Arrhenius activation energy for desorption reaction for ROS039 and Syloid® Al-1.

This difference was quantified using the Arrhenius activation energy for water desorption calculated using the 4 temperatures (27, 40, 50 and 60° C.) which gave 35.2±0.9 kJ/mol for Syloid® AI-1 vs. 43.0±1.6 kJ/mol for ROS-039. FIG. 15 shows the Ln(k) vs. −1/(RT) fits used for calculation of Arrhenius activation energy for desorption reaction. K values were obtained using first-order fits for Syloid® AI-1 and modified Avrami equation fits for ROS-039.

Figure 16:
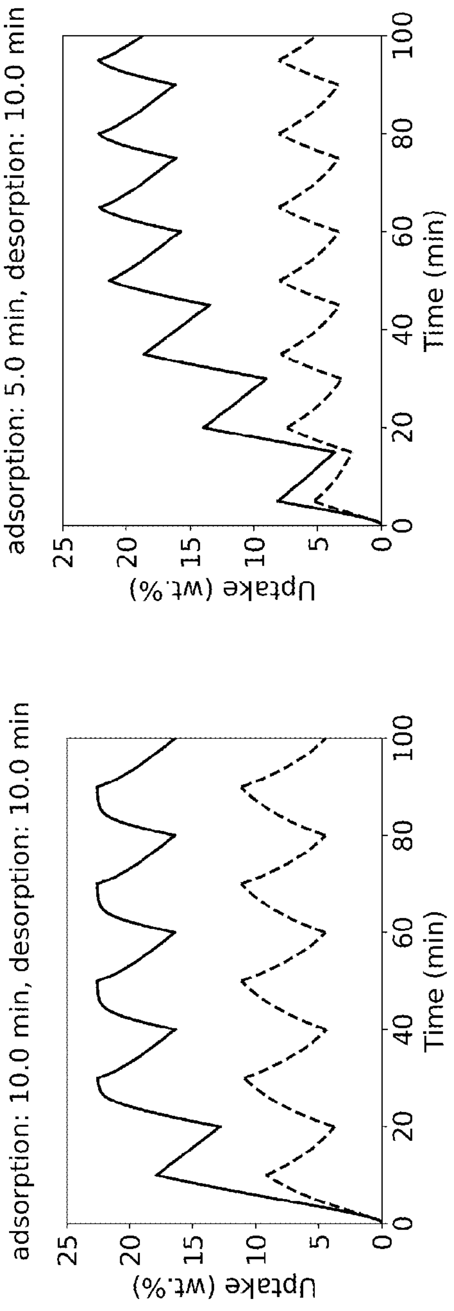
FIG. 16: A series of graphs showing results of humidity swing recycling for ROS039 (upper trace) and Syloid® Al-1 (lower trace).

This significant difference in desorption activation energy translates to at least 100% better performance for ROS-039 than Syloid® AI-1 in these temperature swing experiments. The projected performance of ROS-039 and Syloid® AI-1 under temperature swing conditions is summarised in Table 2. For comparison, the same procedures were used to project humidity swing recycling of ROS-039 and Syloid® AI-1. The results for humidity swing for ROS039 (upper trace) and Syloid® AI-1 (lower trace) are shown in FIG. 16. The data reveal an unexpected improvement in water productivity performance using a temperature swing compared to a humidity swing.

TABLE 2

Figure 14:
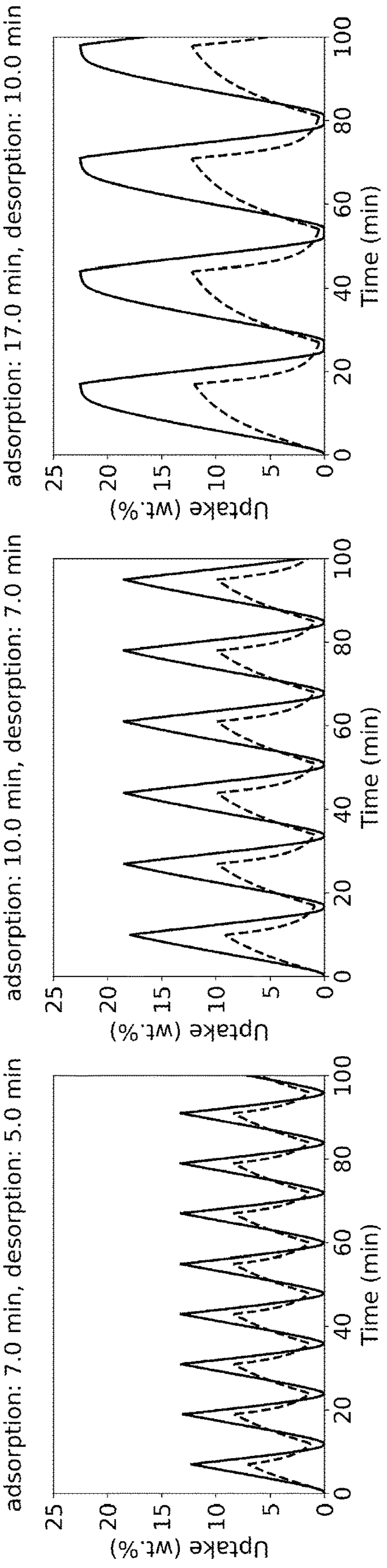
FIG. 14: A series of graphs showing temperature swing cycling performance for ROS039 (upper traces) and Syloid® Al-1 (lower traces) over different adsorption and desorption times.

Summary of humidity and temperature swings for ROS-039 and Syloid ® Al-1 presented in FIGS. 14 and 16 (DVS Adventure).

| Swing type | Sorbent Material | Adsorption time (min) | Desorption time (min) | Water productivity at stationary ads-des cycling (wt. %/min) |
|---|---|---|---|---|
| 30% RH@27° C.- | ROS-039 | 5 | 10 | 0.40 |
| 0% RH@27° C. | Syloid ® Al-1 | 5 | 10 | 0.31 |
| | ROS-039 | 7 | 7 | 0.33 |
| | Syloid ® Al-1 | 7 | 7 | 0.35 |
| | ROS-039 | 10 | 10 | 0.31 |
| | Syloid ® Al-1 | 10 | 10 | 0.33 |
| 30% RH@27° C.- | ROS-039 | 7 | 5 | 1.10 |
| 0% RH@60° C. | Syloid ® Al-1 | 7 | 5 | 0.58 |
| | ROS-039 | 10 | 7 | 1.08 |
| | Syloid ® Al-1 | 10 | 7 | 0.53 |
| | ROS-039 | 17 | 10 | 0.83 |
| | Syloid ® Al-1 | 17 | 10 | 0.30 |

In summary, the present invention provides a method of capturing water from a composition comprising water or water vapour using a hybrid ultramicroporous material. The method comprises the steps of:

(a) providing a hybrid ultramicroporous material of formula $[M(L)_a(X)_b]$; and (b) contacting the hybrid ultramicroporous material with the composition comprising water to capture water into the hybrid ultramicroporous material.

The hybrid ultramicroporous materials used in the method of the present invention have fast kinetics of water uptake and high working capacity compared to known commercial sorbent materials. The method of the present invention may be used in water capture and purification processes to provide fresh water suitable for drinking or for use in agriculture. The method of the present invention may also be used to remove water as a contaminant or for use in dehumification processes. A use of such a hybrid ultramicroporous material and a device for capturing water are also provided.

Although a few preferred embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

For the avoidance of doubt, wherein amounts of components in a composition are described in wt %, this means the weight percentage of the specified component in relation to the whole composition referred to. For example, "wherein the sorbent composition comprises from 10 to 90 wt % of the hybrid ultramicroporous material" means that from 10 to 90 wt % of the sorbent composition is provided by the hybrid ultramicroporous material.

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A method of capturing water from a composition comprising water and/or water vapour, the method comprising:

(a) providing a hybrid ultramicroporous material of formula [M(L)a(X)b];

(b) contacting the hybrid ultramicroporous material with the composition comprising water to capture water into the hybrid ultramicroporous material; and (c) desorbing water from the hybrid ultramicroporous material as water vapour by either:

contacting the hybrid ultramicroporous material with an air stream having a temperature of at least 40° C.; or applying a vacuum to the hybrid ultramicroporous material, wherein:

M is a metal species selected from zinc, cadmium, copper, magnesium, cobalt, nickel, calcium and iron;

L is a ligand comprising a N-containing heterocycle;

X is a halogen linking species;

a is from 0.5 to 3; and b is from 1 to 3.

2. The method according to claim 1 wherein M is zinc.

3. The method according to claim 1 wherein X is fluoride.

4. The method according to claim 1 wherein L is 1,2,4-triazole or 3-amino-1,2,4-triazole.

5. The method according to claim 1 wherein the composition is a gaseous composition comprising water.

6. The method according to claim 1 wherein the composition is a liquid composition comprising water.

7. The method according to claim 1 comprising the further step (d) of condensing the desorbed water vapour to provide liquid water.

8. A method of delivering water to a locus from a composition comprising water or water vapour, the method comprising the steps of:

(i) providing a hybrid microporous material of formula [M(L)a(X)b];

(ii) contacting the hybrid microporous material with water or water vapour to capture water into the hybrid ultramicroporous material;

(iii) transporting and/or storing the hybrid microporous material;

(iv) applying a stimulus to the hybrid microporous material to effect desorption of water retained therein by either contacting the hybrid ultramicroporous material with air having a temperature of at least 40° C.; or applying a vacuum to the hybrid ultramicroporous material; and (v) collecting desorbed water at the locus;

wherein:

M is a metal species selected from zinc, cadmium, copper, magnesium, cobalt, nickel, calcium and iron;

L is a ligand comprising a N-containing heterocycle;

X is a halogen linking species;

a is from 0.5 to 3; and b is from 1 to 3.

9. The method according to claim 1 wherein at least 12 wt % of water, based on the weight of the hybrid ultramicroporous material, is captured in 5 minutes.

10. The method according to claim 1 wherein at least 2,000 wt % of water per day, based on the weight of the hybrid ultramicroporous material, is captured.

11. The method according to claim 4 wherein L is 1,2,4-triazole.

12. The method according to claim 5 wherein the composition is air.

13. The method according to claim 6 wherein the composition is salted water and/or waste water.

* * * * *